(12) United States Patent
Clark

(10) Patent No.: US 11,279,071 B2
(45) Date of Patent: *Mar. 22, 2022

(54) METHOD OF MANUFACTURING BULKED CONTINUOUS CARPET FILAMENT

(71) Applicant: Aladdin Manufacturing Corporation, Calhoun, GA (US)

(72) Inventor: Thomas R. Clark, Chattanooga, TN (US)

(73) Assignee: Aladdin Manufacturing Corporation, Calhoun, GA (US)

( * ) Notice: Subject to any disclaimer, the term of this patent is extended or adjusted under 35 U.S.C. 154(b) by 220 days.

This patent is subject to a terminal disclaimer.

(21) Appl. No.: 16/489,875

(22) PCT Filed: Mar. 2, 2018

(86) PCT No.: PCT/US2018/020746
§ 371 (c)(1),
(2) Date: Aug. 29, 2019

(87) PCT Pub. No.: WO2018/161021
PCT Pub. Date: Sep. 7, 2018

(65) Prior Publication Data
US 2020/0240042 A1 Jul. 30, 2020

Related U.S. Application Data

(60) Provisional application No. 62/466,632, filed on Mar. 3, 2017.

(51) Int. Cl.
*B29B 13/10* (2006.01)
*B29B 17/02* (2006.01)
(Continued)

(52) U.S. Cl.
CPC ........ *B29C 48/2715* (2019.02); *B29B 7/426* (2013.01); *B29B 7/485* (2013.01);
(Continued)

(58) Field of Classification Search
CPC ........ B08B 9/027; B08B 17/02; B29B 13/10; B29B 2017/0015; B29B 17/02;
(Continued)

(56) References Cited

U.S. PATENT DOCUMENTS 1,490,918 A   4/1924   Gaede
2,146,532 A   2/1939   Crane
(Continued)

FOREIGN PATENT DOCUMENTS

AU   2013267847   3/2014
AU   2014215998   9/2014
(Continued)

OTHER PUBLICATIONS

Translation of CN 202986059 U (published on Jun. 12, 2013).*
(Continued)

*Primary Examiner* — Leo B Tentoni
(74) *Attorney, Agent, or Firm* — Brient IP Law, LLC

(57) ABSTRACT

In particular embodiments, a process for producing bulked continuous carpet filament from recycled polymer utilizes two vacuum pumps (140A, 140B) in combination with a single extruder (100). In various embodiments, the dual vacuum arrangement (e.g., at least two vacuum pumps (140A, 140B)) operably coupled to the single extruder (e.g., MRS extruder (100)) may be configured to remove one or more impurities from recycled polymer as the recycled polymer passes through the extruder.

19 Claims, 8 Drawing Sheets

(51) Int. Cl.

| | | |
|---|---|---|
| B29B 17/04 | (2006.01) | |
| D02G 3/24 | (2006.01) | |
| B29C 48/27 | (2019.01) | |
| D01D 5/08 | (2006.01) | |
| B29C 48/05 | (2019.01) | |
| B29C 48/38 | (2019.01) | |
| B29C 48/375 | (2019.01) | |
| B29B 7/74 | (2006.01) | |
| B29C 48/00 | (2019.01) | |
| B29C 48/92 | (2019.01) | |
| B29B 7/48 | (2006.01) | |
| B29B 7/42 | (2006.01) | |
| B29B 7/86 | (2006.01) | |
| B29C 48/435 | (2019.01) | |
| B29C 48/76 | (2019.01) | |
| D01D 13/02 | (2006.01) | |
| B29C 37/00 | (2006.01) | |
| B29C 48/43 | (2019.01) | |
| B29C 48/385 | (2019.01) | |
| B29C 48/425 | (2019.01) | |
| B29K 67/00 | (2006.01) | |
| B29L 31/00 | (2006.01) | |
| D01F 6/62 | (2006.01) | |
| B29K 105/26 | (2006.01) | |
| B29B 13/00 | (2006.01) | |
| B29C 48/44 | (2019.01) | |
| B29B 17/00 | (2006.01) | |

(52) U.S. Cl.
CPC .............. *B29B 7/487* (2013.01); *B29B 7/748* (2013.01); *B29B 7/7461* (2013.01); *B29B 7/7485* (2013.01); *B29B 7/86* (2013.01); *B29C 37/006* (2013.01); *B29C 48/022* (2019.02); *B29C 48/05* (2019.02); *B29C 48/27* (2019.02); *B29C 48/375* (2019.02); *B29C 48/38* (2019.02); *B29C 48/385* (2019.02); *B29C 48/425* (2019.02); *B29C 48/43* (2019.02); *B29C 48/435* (2019.02); *B29C 48/76* (2019.02); *B29C 48/766* (2019.02); *B29C 48/92* (2019.02); *D01D 5/08* (2013.01); *D01D 13/02* (2013.01); B29B 2013/005 (2013.01); B29B 2017/0015 (2013.01); B29B 2017/0203 (2013.01); *B29C 48/44* (2019.02); *B29C 2791/006* (2013.01); *B29C 2948/922* (2019.02); *B29C 2948/92019* (2019.02); *B29C 2948/92466* (2019.02); *B29C 2948/92514* (2019.02); *B29C 2948/92723* (2019.02); *B29C 2948/92895* (2019.02); *B29K 2067/003* (2013.01); *B29K 2105/26* (2013.01); *B29L 2031/731* (2013.01); *B29L 2031/7322* (2013.01); *D01F 6/62* (2013.01); *D10B 2331/04* (2013.01); *D10B 2503/04* (2013.01)

(58) Field of Classification Search
CPC ............ B29B 2017/0203; B29B 17/04; B29C 37/006; B29C 48/27; B29C 48/2715; B29C 48/385; B29C 48/425; B29C 48/43; B29C 48/435; B29C 48/44; B29C 48/766; B29C 48/92; B29C 2791/006; B29C 2948/92019; B29C 2948/922; B29C 2948/92514; B29K 2067/003; B29K 2105/26; D01D 5/08; D01F 6/62; D02G 3/24; D10B 2331/04
USPC .............. 264/39, 40.1, 40.3, 101, 102, 140, 264/211.21, 211.22, 211.23, 918, 920; 134/22.1

See application file for complete search history.

(56) References Cited

U.S. PATENT DOCUMENTS

| | | |
|---|---|---|
| 3,217,783 A | 11/1965 | Rodenacker |
| 3,310,837 A | 3/1967 | Wittrock |
| 3,357,049 A | 12/1967 | Spindler |
| 3,608,001 A | 9/1971 | Kowalski et al. |
| 3,825,236 A | 7/1974 | Hussmann et al. |
| 3,865,528 A | 2/1975 | Roess |
| 3,938,924 A | 2/1976 | Abella et al. |
| 4,057,376 A | 11/1977 | Berger |
| 4,057,607 A | 11/1977 | Soehngen et al. |
| 4,128,386 A | 12/1978 | Wissinger et al. |
| 4,172,477 A | 10/1979 | Reich |
| 4,192,617 A | 3/1980 | Spielhoff |
| 4,268,176 A | 5/1981 | Muller |
| 4,269,798 A | 5/1981 | Ives |
| 4,272,475 A | 6/1981 | Chi |
| 4,289,409 A | 9/1981 | Brand |
| 4,370,302 A | 1/1983 | Suzuoka et al. |
| 4,564,349 A | 1/1986 | Brown |
| 4,591,487 A | 5/1986 | Fritsch |
| 4,675,378 A | 6/1987 | Gibbon et al. |
| 4,919,872 A | 4/1990 | Fintel |
| 5,102,594 A | 4/1992 | Burlet et al. |
| 5,108,711 A | 4/1992 | Chszaniecki |
| 5,143,308 A | 9/1992 | Hally et al. |
| 5,224,383 A | 7/1993 | Pinto et al. |
| 5,225,130 A | 7/1993 | Deiringer |
| 5,266,601 A | 11/1993 | Kyber et al. |
| 5,306,803 A | 4/1994 | Arlt et al. |
| 5,339,255 A | 8/1994 | Suzuki et al. |
| 5,393,140 A | 2/1995 | Blach |
| 5,424,013 A | 6/1995 | Lieberman |
| 5,427,881 A | 6/1995 | Sacripante et al. |
| 5,459,168 A | 10/1995 | Nasr et al. |
| 5,497,562 A | 3/1996 | Pikus |
| 5,503,788 A | 4/1996 | Lazareck et al. |
| 5,510,073 A | 4/1996 | Kaegi et al. |
| 5,532,035 A | 7/1996 | Corbin et al. |
| 5,549,957 A | 8/1996 | Negola et al. |
| 5,554,657 A | 9/1996 | Brownscombe et al. |
| 5,613,285 A | 3/1997 | Chester et al. |
| 5,623,012 A | 4/1997 | Hwo |
| 5,715,584 A | 2/1998 | Coons, III et al. |
| 5,804,115 A | 9/1998 | Burton et al. |
| 5,836,682 A | 11/1998 | Blach |
| 5,886,058 A | 3/1999 | Van Erden et al. |
| 5,893,702 A | 4/1999 | Conrad et al. |
| 5,932,691 A | 8/1999 | Khanin et al. |
| 5,945,215 A | 8/1999 | Bersted et al. |
| 5,951,159 A | 9/1999 | Schobert-Csongor |
| 5,958,548 A | 9/1999 | Negola et al. |
| 5,961,054 A | 10/1999 | Nishibori |
| 6,007,892 A | 12/1999 | Harwood et al. |
| 6,074,084 A | 6/2000 | Kolossow |
| 6,113,825 A | 9/2000 | Chuah |
| 6,265,533 B1 | 7/2001 | Regel et al. |
| 6,281,278 B1 | 8/2001 | Takase et al. |
| 6,394,644 B1 | 5/2002 | Streiff |
| 6,492,485 B1 | 12/2002 | Gohr et al. |
| 6,620,354 B1 | 9/2003 | Bessemer et al. |
| 6,627,127 B1 | 9/2003 | Piovoso et al. |
| 6,722,117 B2 | 4/2004 | Belcher, Jr. et al. |
| 6,773,718 B2 | 8/2004 | Seth et al. |
| 6,780,941 B2 | 8/2004 | Studholme et al. |
| 6,784,214 B1 | 8/2004 | Bacher et al. |
| 6,852,256 B2 | 2/2005 | Borer et al. |
| 6,866,171 B2 | 3/2005 | Ickinger |
| 6,984,694 B2 | 1/2006 | Blasius, Jr. et al. |
| 7,025,491 B2 | 4/2006 | Blach et al. |
| 7,192,545 B2 | 3/2007 | Ekart et al. |
| 7,198,400 B2 | 4/2007 | Unterlander et al. |
| 7,204,945 B2 | 4/2007 | Bonner |
| 7,262,380 B1 | 8/2007 | Ulrichsen et al. |
| 7,320,589 B2 | 1/2008 | Babin et al. |
| 7,354,988 B2 | 4/2008 | Charati et al. |
| 7,380,973 B2 | 6/2008 | Goedicke et al. |

(56) References Cited

U.S. PATENT DOCUMENTS

| | | |
|---|---|---|
| 7,485,685 B2 | 2/2009 | Mihan et al. |
| 7,513,677 B2 | 4/2009 | Gneuss et al. |
| 7,594,453 B2 | 9/2009 | Blach |
| 7,628,892 B2 | 12/2009 | Fini |
| 7,654,725 B2 | 2/2010 | Sturm et al. |
| 7,700,015 B2 | 4/2010 | Kern et al. |
| 7,744,788 B2 | 6/2010 | Portier et al. |
| 7,799,835 B2 | 9/2010 | Smith et al. |
| 7,828,538 B2 | 11/2010 | Fellinger |
| 7,902,262 B2 | 3/2011 | Armstrong et al. |
| 7,928,150 B2 | 4/2011 | Kannan et al. |
| 7,935,737 B2 | 5/2011 | Gopal et al. |
| 7,980,834 B2 | 7/2011 | Maguire |
| 8,080,190 B2 | 12/2011 | Ichikawa et al. |
| 8,147,738 B2 | 4/2012 | Boczon et al. |
| 8,187,512 B2 | 5/2012 | Eloo et al. |
| 8,398,752 B2 | 3/2013 | Brownstein et al. |
| 8,404,755 B2 | 3/2013 | Sequeira |
| 8,444,886 B2 | 5/2013 | Herve |
| 8,471,972 B2 | 6/2013 | Tsubata |
| 8,557,155 B2 | 10/2013 | Deiss et al. |
| 8,597,553 B1 | 12/2013 | Clark |
| 8,735,457 B2 | 5/2014 | Booth et al. |
| 8,741,972 B2 | 6/2014 | Booth et al. |
| 8,795,811 B2 | 8/2014 | Cloutier et al. |
| 9,061,442 B2 | 6/2015 | Gneuss et al. |
| 9,149,955 B2 | 10/2015 | Bower et al. |
| 9,168,718 B2 | 10/2015 | Westwood et al. |
| 9,409,363 B2 | 8/2016 | Clark |
| 9,550,338 B2 | 1/2017 | Clark |
| 9,630,353 B2 | 4/2017 | Clark |
| 9,630,354 B2 | 4/2017 | Clark |
| 9,636,845 B2 | 5/2017 | Clark |
| 9,636,860 B2 | 5/2017 | Clark |
| 9,908,263 B2 | 3/2018 | Pichler et al. |
| 9,975,278 B2 | 5/2018 | Rabiser et al. |
| 10,124,513 B2 | 11/2018 | Clark |
| 10,532,495 B2 | 1/2020 | Clark |
| 2002/0086077 A1 | 7/2002 | Noller et al. |
| 2004/0053047 A1 | 3/2004 | Jackson et al. |
| 2004/0063860 A1 | 4/2004 | Marston et al. |
| 2004/0082672 A1 | 4/2004 | Zeng et al. |
| 2004/0140248 A1 | 7/2004 | Dauzvardis et al. |
| 2004/0155374 A1 | 8/2004 | Hutchinson et al. |
| 2005/0047267 A1 | 3/2005 | Gneuss et al. |
| 2005/0081786 A1* | 4/2005 | Kubista ............... C23C 16/4412 118/715 |
| 2005/0263941 A1 | 12/2005 | Reutter et al. |
| 2006/0012074 A1 | 1/2006 | Booth et al. |
| 2006/0076705 A1 | 4/2006 | Fowler et al. |
| 2006/0284334 A1 | 12/2006 | Christel |
| 2007/0000947 A1 | 1/2007 | Lewis et al. |
| 2007/0009750 A1 | 1/2007 | Ito et al. |
| 2007/0052131 A1 | 3/2007 | Fujimaki et al. |
| 2007/0261777 A1 | 11/2007 | Steckelberg et al. |
| 2008/0004202 A1 | 1/2008 | Wolfgang et al. |
| 2008/0069916 A1 | 3/2008 | Regalia |
| 2008/0139700 A1 | 6/2008 | Roden et al. |
| 2008/0157425 A1 | 7/2008 | Rodgers et al. |
| 2008/0214701 A1 | 9/2008 | Wilms et al. |
| 2008/0272508 A1 | 11/2008 | Culbert et al. |
| 2008/0274320 A1 | 11/2008 | Yokoyama et al. |
| 2008/0292831 A1 | 11/2008 | Juriga et al. |
| 2009/0004325 A1 | 1/2009 | Bacher et al. |
| 2009/0039542 A1 | 2/2009 | Morton-Finger |
| 2009/0270564 A1 | 10/2009 | Gorlier et al. |
| 2009/0286919 A1 | 11/2009 | Moeller et al. |
| 2010/0102475 A1 | 4/2010 | Moon et al. |
| 2010/0113626 A1 | 5/2010 | Liu |
| 2011/0177283 A1 | 7/2011 | Juriga |
| 2011/0257345 A1 | 10/2011 | Hoover, Jr. et al. |
| 2012/0070615 A1 | 3/2012 | Shi et al. |
| 2012/0279023 A1 | 11/2012 | Burout et al. |
| 2013/0133697 A1* | 5/2013 | Stockman ............... B08B 17/02 134/22.1 |
| 2015/0069652 A1 | 3/2015 | Clark |
| 2015/0069655 A1 | 3/2015 | Clark |
| 2015/0076725 A1 | 3/2015 | Clark |
| 2015/0076744 A1 | 3/2015 | Clark |
| 2017/0136761 A1 | 5/2017 | Sieradzki et al. |
| 2017/0152611 A1 | 6/2017 | Clark |
| 2017/0275785 A1 | 9/2017 | Williams et al. |
| 2018/0126595 A1 | 5/2018 | Clark |
| 2018/0127893 A1 | 5/2018 | Clark |
| 2018/0362723 A1 | 12/2018 | Gneuss et al. |
| 2020/0055213 A1 | 2/2020 | Clark |

FOREIGN PATENT DOCUMENTS

| | | | |
|---|---|---|---|
| CH | 170967 A | 8/1934 | |
| CN | 1391511 | 1/2003 | |
| CN | 101444954 | 6/2009 | |
| CN | 101778705 | 7/2010 | |
| CN | 201872322 | 6/2011 | |
| CN | 202072825 | 12/2011 | |
| CN | 102990903 | 3/2013 | |
| CN | 202986059 U * | 6/2013 | ............ B29C 48/76 |
| CN | 104040040 | 9/2014 | |
| CN | 204265905 | 4/2015 | |
| DE | 2243024 A1 | 3/1973 | |
| DE | 3801574 | 8/1989 | |
| DE | 4433593 | 6/1995 | |
| DE | 19722278 | 12/1998 | |
| DE | 102006033089 | 10/2007 | |
| DE | 102008018686 | 10/2009 | |
| DE | 102011082769 | 3/2013 | |
| DE | 102013000316 | 7/2014 | |
| DE | 102017111275 | 11/2018 | |
| EP | 0336520 | 10/1989 | |
| EP | 0846860 A2 | 6/1998 | |
| EP | 0881054 | 12/1998 | |
| EP | 1054083 | 11/2000 | |
| EP | 1400332 | 3/2004 | |
| EP | 1434680 B1 | 7/2006 | |
| EP | 2748358 | 7/2014 | |
| EP | 3375916 | 9/2018 | |
| GB | 2059864 | 4/1981 | |
| GB | 1601699 | 11/1981 | |
| GB | 2141844 | 1/1985 | |
| JP | 63191823 | 8/1988 | |
| JP | 2003530478 | 10/2003 | |
| JP | 2007186830 | 7/2007 | |
| WO | 2001021373 | 3/2001 | |
| WO | 2002038276 | 5/2002 | |
| WO | 2003033240 | 4/2003 | |
| WO | 2004/026557 | 4/2004 | |
| WO | 2008017843 | 2/2008 | |
| WO | 2008083035 | 7/2008 | |
| WO | 2008083820 | 7/2008 | |
| WO | 2010133531 | 11/2010 | |
| WO | 2011088437 | 7/2011 | |
| WO | 2011095361 | 8/2011 | |
| WO | 2012119165 | 9/2012 | |
| WO | 2013180941 | 12/2013 | |
| WO | 2016081474 | 5/2016 | |
| WO | 2016081495 | 5/2016 | |
| WO | 2016081508 | 5/2016 | |
| WO | 2016081568 | 5/2016 | |
| WO | 2018089346 | 5/2018 | |
| WO | 2018140884 | 8/2018 | |
| WO | 2018161021 | 9/2018 | |

OTHER PUBLICATIONS

Notice of Allowance, dated Feb. 25, 2021, from corresponding U.S. Appl. No. 16/664,724.

Office Action, dated Mar. 1, 2021, from corresponding U.S. Appl. No. 16/131,397.

International Preliminary Report on Patentability, dated Sep. 12, 2019, from corresponding International Application No. PCT/US2018/020746.

Office Action, dated Sep. 12, 2019, from corresponding U.S. Appl. No. 16/432,579.

(56) References Cited

OTHER PUBLICATIONS

Notice of Allowance, dated Oct. 10, 2019, from corresponding U.S. Appl. No. 16/432,579.
Final Office Action, dated Jun. 11, 2020, from corresponding U.S. Appl. No. 15/804,501.
Final Office Action, dated Jun. 11, 2020, from corresponding U.S. Appl. No. 16/409,599.
Gneuss website, https://www.gneuss.com/en/polymer-technologies/extrusion/mrs-extruder/, dated Jun. 5, 2020, pp. 1-4.
Final Office Action, dated Jun. 15, 2020, from corresponding U.S. Appl. No. 16/557,076.
Office Action, dated Jun. 24, 2020, from corresponding U.S. Appl. No. 16/348,117.
Office Action, dated Aug. 26, 2019, from corresponding U.S. Appl. No. 16/220,905.
Office Action, dated Dec. 17, 2020, from corresponding U.S. Appl. No. 15/910,853.
Final Office Action, dated Dec. 31, 2020, from corresponding U.S. Appl. No. 16/348,117.
Office Action, dated Jan. 8, 2021, from corresponding U.S. Appl. No. 16/557,076.
Notice of Allowance, dated Jan. 13, 2021, from corresponding U.S. Appl. No. 16/537,844.
Notice of Allowance, dated Oct. 28, 2013, from corresponding U.S. Appl. No. 13/721,955.
Notice of Allowance, dated Sep. 12, 2016, from corresponding U.S. Appl. No. 13/892,713.
Notice of Opposition, dated Dec. 17, 2015, from corresponding European Application No. 13728264.6.
Office Action, dated Apr. 9, 2018, from corresponding U.S. Appl. No. 15/204,645.
Office Action, dated Aug. 21, 2015, from corresponding U.S. Appl. No. 14/256,261.
Office Action, dated Aug. 27, 2018, from corresponding U.S. Appl. No. 15/473,385.
Office Action, dated Aug. 27, 2018, from corresponding U.S. Appl. No. 15/473,402.
Office Action, dated Jul. 23, 2019, from corresponding U.S. Appl. No. 16/041,442.
Office Action, dated Jun. 1, 2016, from corresponding U.S. Appl. No. 14/546,837.
Office Action, dated Jun. 10, 2013, from corresponding U.S. Appl. No. 13/721,955.
Office Action, dated Jun. 13, 2016, from corresponding U.S. Appl. No. 14/546,847.
Office Action, dated Jun. 18, 2019, from corresponding U.S. Appl. No. 16/402,583.
Office Action, dated Jun. 22, 2016, from corresponding U.S. Appl. No. 14/546,796.
Office Action, dated Jun. 30, 2016, from corresponding U.S. Appl. No. 13/892,740.
Office Action, dated Mar. 24, 2016, from corresponding U.S. Appl. No. 13/892,713.
Office Action, dated May 26, 2016, from corresponding U.S. Appl. No. 14/546,819.
Office Action, dated May 6, 2019, from corresponding U.S. Appl. No. 15/348,591.
Office Action, dated Oct. 9, 2018, from corresponding U.S. Appl. No. 15/419,955.
Office Action, dated Sep. 7, 2018, from corresponding U.S. Appl. No. 15/396,143.
Restriction Requirement, dated Apr. 30, 2013, from corresponding U.S. Appl. No. 13/721,955.
Restriction Requirement, dated Feb. 5, 2019, from corresponding U.S. Appl. No. 16/220,733.
Restriction Requirement, dated Jul. 15, 2019, from corresponding U.S. Appl. No. 16/432,579.
Schiefer,Process Engineering, Rowohlt Taschenbuch Verlag GmbH, Aug. 1972.
Vietnamese Office Action, dated Jul. 13, 2016, from corresponding Vietnamese Patent Application No. 1-2014-01079.
Wikipedia, Polyethylene terephthalate, https://en.wikipedia.org/w/index.php?title=Polyethylene_terephthalate&oldid=491494734.
Written Opinion of the International Searching Authority, dated Apr. 12, 2018, from corresponding International Application No. PCT/US2018/015751.
Written Opinion of the International Searching Authority, dated Feb. 2, 2016, from corresponding International Application No. PCT/US2015/061116.
Written Opinion of the International Searching Authority, dated Feb. 2, 2016, from corresponding International Application No. PCT/US2015/061145.
Written Opinion of the International Searching Authority, dated Feb. 5, 2016, from corresponding International Application No. PCT/US2015/061174.
Written Opinion of the International Searching Authority, dated Jan. 20, 2016, from corresponding International Application No. PCT/US2015/061288.
Written Opinion of the International Searching Authority, dated Mar. 1, 2018, from corresponding International Application Serial No. PCT/US2017/060359.
Written Opinion of the International Searching Authority, dated Nov. 19, 2018, from corresponding International Application No. PCT/US2018/051043.
Written Opinion of the International Searching Authority, dated Sep. 2, 2013, from corresponding International Application No. PCT/US2013/040753.
Office Action, dated Aug. 8, 2019, from corresponding U.S. Appl. No. 16/409,599.
International Preliminary Report on Patentability, dated Aug. 8, 2019, from corresponding International Application No. PCT/US2018/015751.
Office Action, dated Aug. 13, 2019, from corresponding U.S. Appl. No. 16/213,694.
Botos, J., et al., "Color Measurement of Plastics—from Compounding via Pelletizing, up to Injection Molding and Extrusion," AIP Conference Proceedings 1593, 16 (2014), https://doi.org/10.1063/1.4873725, Feb. 17, 2015.
Machado, Almir De Souza, "Fundamentals of Cast Film Extrusion Technology," https://www.slideshare.net/ASMachado/fundamentals-of-cast-film-extrusion-technology, Dec. 2, 2013.
Notice of Allowance, dated Aug. 19, 2019, from corresponding U.S. Appl. No. 16/402,583.
International Search Report, dated Apr. 26, 2018, from corresponding International Application No. PCT/US2018/020746.
Written Opinion of the International Searching Authority, dated Apr. 26, 2018, from corresponding International Application No. PCT/US2018/020746.
International Preliminary Report on Patentability, dated Feb. 4, 2021, from corresponding International Application No. PCT/US2019/042456.
International Preliminary Report on Patentability, dated Feb. 4, 2021, from corresponding International Application No. PCT/US2019/042458.
Office Action, dated Feb. 12, 2021, from corresponding U.S. Appl. No. 16/480,302.
Office Action, dated Sep. 1, 2020, from corresponding U.S. Appl. No. 16/537,844.
Office Action, dated Oct. 27, 2020, from corresponding U.S. Appl. No. 16/409,599.
Restriction Requirement, dated Oct. 20, 2020, from corresponding U.S. Appl. No. 16/480,302.
Notice of Allowance, dated Feb. 12, 2020, from corresponding U.S. Appl. No. 16/220,905.
Office Action, dated Feb. 21, 2020, from corresponding U.S. Appl. No. 15/910,853.
Notice of Allowance, dated Feb. 28, 2020, from corresponding U.S. Appl. No. 16/664,730.
Notice of Allowance, dated Mar. 3, 2020, from corresponding U.S. Appl. No. 16/213,694.
"MRS extrusion technology offers new options in PET", Plastics Additives and Compounding, Elsevier Science, Oxofrd, GB, vol.

(56) References Cited

OTHER PUBLICATIONS

11, No. 2, Mar. 1, 2009 (Mar. 1, 2009), pp. 24-26, XP026067788, ISSN: 1464-391X. DOI:10.1016/S1464-391X(09)70050-9 [retrieved on Mar 1, 2009] the whole document.
"Processing Technology: Processing of Polymer Melts," Oct. 31, 2007, Gneuss Kunststofftechnik GmbH, Dusseldorf, Germany.
Australian Office Action, dated Aug. 26, 2015, from corresponding Australian Patent Application No. 2014215998.
Australian Office Action, dated Dec. 5, 2016, from corresponding Australian Patent Application No. 2016234917.
Australian Office Action, dated May 9, 2014, from corresponding Australian Patent Application No. 2013267847.
Chinese Office Action, dated May 12, 2016, from corresponding Chinese Patent Application No. 201380003461.8.
Chinese Office Action, dated Sep. 14, 2015, from corresponding Chinese Patent Application No. 201380003461.8.
Decision of Patent Grant, dated Dec. 12, 2014, from corresponding Korean Patent Application No. 10-2014-7016621.
European Office Action, dated Dec. 12, 2016, from corresponding European Patent Application No. 15158377.0.
Ex Parte Quayle Action, dated Mar. 11, 2019, from corresponding U.S. Appl. No. 16/220,733.
Extended European Search Report, dated Aug. 26, 2015, from corresponding European Application No. 15158377.0.
Extended European Search Report, dated Jul. 24, 2018, from corresponding European Patent Application No. 18170112.9.
Final Office Action, dated Dec. 24, 2015, from corresponding U.S. Appl. No. 14/256,261.
Final Office Action, dated May 22, 2019, from corresponding U.S. Appl. No. 15/396,143.
Final Office Action, dated Oct. 19, 2016, from corresponding U.S. Appl. No. 14/546,819.
Final Office Action, dated Oct. 19, 2016, from corresponding U.S. Appl. No. 14/546,837.
Final Office Action, dated Oct. 19, 2016, from corresponding U.S. Appl. No. 14/546,847.
Final Office Action, dated Oct. 20, 2016, from corresponding U.S. Appl. No. 14/546,796.
Gneuss M: "Multi Rotation System Extruder Leads to Breakthrough in Polymer Evacuation", International Fiber Journal, International Media Group, Charlotte, NC, US, vol. 23, No. 1, Feb. 1, 2008 (Feb. 1, 2008), pp. 40-41, XP001514827, ISSN: 1049-801X the whole document.
Hannemann, Innovative Aufbereitungslösung für PET mit uneingeschränkter FDA—Lebensmittelzulassung, Presentation, Mar. 15, 2012, 37 pages total, Gneuss Kunststofftechnik GmbH, Germany.
International Preliminary Report on Patentability, dated Dec. 11, 2014, from corresponding International Application No. PCT/US2013/040753.
International Preliminary Report on Patentability, dated Dec. 2, 2014, from corresponding International Application No. PCT/US2013/040753.
International Preliminary Report on Patentability, dated Jun. 1, 2017, from corresponding International Application No. PCT/US2015/061116.
International Preliminary Report on Patentability, dated Jun. 1, 2017, from corresponding International Application No. PCT/US2015/061145.
International Preliminary Report on Patentability, dated Jun. 1, 2017, from corresponding International Application No. PCT/US2015/061174.
International Preliminary Report on Patentability, dated Jun. 1, 2017, from corresponding International Application No. PCT/US2015/061288.
International Search Report, dated Apr. 12, 2018, from corresponding International Application No. PCT/US2018/015751.
International Search Report, dated Feb. 2, 2016, from corresponding International Application No. PCT/US2015/061116.
International Search Report, dated Feb. 2, 2016, from corresponding International Application No. PCT/US2015/061145.
International Search Report, dated Feb. 5, 2016, from corresponding International Application No. PCT/US2015/061174.
International Search Report, dated Jan. 20, 2016, from corresponding International Application No. PCT/US2015/061288.
International Search Report, dated Mar. 1, 2018, from corresponding International Application Serial No. PCT/US2017/060359.
International Search Report, dated Nov. 19, 2018, from corresponding International Application No. PCT/US2018/051043.
International Search Report, dated Sep. 2, 2013, from corresponding International Application No. PCT/US2013/040753.
Invitation to Pay Additional Search Fees, dated Jan. 5, 2018, from corresponding International Application Serial No. PCT/US2017/060359.
Jaecker M: "The Conceptual Concept of the Future // Advantages of the Negative-Conical Gangti Efe on Double-Screw Extruders", Kunststoffe, Carl Hanser Verlag, Munchen, DE, vol. 99, No. 12, Dec. 1, 2000 (2000-12-91), p. 64,66, XP990976191, ISSN: 9923-5563, figure 1.
Korean Office Action, dated Aug. 18, 2014, from corresponding Korean Patent Application No. 10-2014-7016621.
Notice of Acceptance, dated Jun. 21, 2016, from corresponding Australian Patent Application No. 2014215998.
Notice of Acceptance, dated Nov. 10, 2014, from corresponding Australian Patent Application No. 2013267847.
Notice of Allowance, dated Apr. 13, 2016, from corresponding U.S. Appl. No. 14/256,261.
Notice of Allowance, dated Apr. 17, 2019, from corresponding U.S. Appl. No. 16/220,733.
Notice of Allowance, dated Aug. 1, 2019, from corresponding U.S. Appl. No. 15/396,143.
Notice of Allowance, dated Dec. 13, 2018, from corresponding U.S. Appl. No. 15/473,385.
Notice of Allowance, dated Feb. 2, 2017, from corresponding U.S. Appl. No. 14/546,819.
Notice of Allowance, dated Feb. 2, 2017, from corresponding U.S. Appl. No. 14/546,837.
Notice of Allowance, dated Feb. 2, 2017, from corresponding U.S. Appl. No. 14/546,847.
Notice of Allowance, dated Feb. 3, 2017, from corresponding U.S. Appl. No. 14/546,796.
Notice of Allowance, dated Jan. 24, 2019, from corresponding U.S. Appl. No. 15/473,402.
Notice of Allowance, dated Jul. 5, 2018, from corresponding U.S. Appl. No. 15/204,645.
Notice of Allowance, dated May 1, 2019, from corresponding U.S. Appl. No. 15/419,955.
Final Office Action, dated Jul. 8, 2020, from corresponding U.S. Appl. No. 15/910,853.
Restriction Requirement, dated Jul. 1, 2020, from corresponding U.S. Appl. No. 16/041,586.
Notice of Allowance, dated Apr. 29, 2020, from corresponding U.S. Appl. No. 15/348,591.
Office Action, dated May 27, 2020, from corresponding U.S. Appl. No. 16/131,397.
Austrian Patent Application No. A 330/2011, filed Mar. 10, 2011, entitled "Verfahren und Vorrichtung zum Entfernen von Verunreinigungen aus einer Kunststoffschmelze".
International Search Report, dated Jul. 5, 2012, from corresponding International Application No. PCT/AT2012/000052.
International Search Report, dated Oct. 30, 2019, from corresponding International Application No. PCT/US2019/042456.
Invitation to Pay Additional Fees, dated Oct. 18, 2019, from corresponding International Application No. PCT/US2019/042458.
Office Action, dated Nov. 25, 2019, from corresponding U.S. Appl. No. 15/804,501.
Written Opinion of the International Searching Authority, dated Oct. 30, 2019, from corresponding International Application No. PCT/US2019/042456.
Office Action, dated Dec. 2, 2019, from corresponding U.S. Appl. No. 16/664,730.

(56) References Cited

OTHER PUBLICATIONS

Office Action, dated Nov. 29, 2019, from corresponding U.S. Appl. No. 16/557,076.
International Preliminary Report on Patentability, dated Mar. 26, 2020, from corresponding International Application No. PCT/US2018/051043.
Notice of Allowance, dated Apr. 9, 2020, from corresponding U.S. Appl. No. 16/684,490.
International Search Report, dated Sep. 3, 2020, from corresponding International Application No. PCT/US2020/036094.
Written Opinion of the International Searching Authority, dated Sep. 3, 2020, from corresponding International Application No. PCT/US2020/036094.
Office Action, dated Nov. 2, 2020, from corresponding U.S. Appl. No. 15/804,501.
Office Action, dated Nov. 18, 2020, from corresponding U.S. Appl. No. 16/664,724.
Final Office Action, dated Jan. 9, 2020, from corresponding U.S. Appl. No. 15/348,591.
International Search Report, dated Dec. 10, 2019, from corresponding International Application No. PCT/US2019/042458.
Office Action, dated Jan. 29, 2020, from corresponding U.S. Appl. No. 16/684,490.
Written Opinion of the International Searching Authority, dated Dec. 10, 2019, from corresponding International Application No. PCT/US2019/042458.
Notice of Allowance, dated Feb. 3, 2020, from corresponding U.S. Appl. No. 16/041,442.
European Search Report, dated Apr. 28, 2020, from corresponding European Application No. 17869117.6.
Final Office Action, dated Sep. 28, 2020, from corresponding U.S. Appl. No. 16/131,397.
Office Action, dated Jun. 25, 2021, from corresponding U.S. Appl. No. 16/816,409.
Final Office Action, dated Jul. 30, 2021, from corresponding U.S. Appl. No. 15/910,853.
Office Action, dated Aug. 6, 2021, from corresponding U.S. Appl. No. 16/518,261.
Advisory Action, dated Apr. 9, 2021, from corresponding U.S. Appl. No. 16/348,117.
Final Office Action, dated Apr. 27, 2021, from corresponding U.S. Appl. No. 15/910,853.
Office Action, dated May 4, 2021, from corresponding U.S. Appl. No. 16/409,599.
Restriction Requirement, dated May 17, 2021, from corresponding U.S. Appl. No. 16/514,898.
Final Office Action, dated May 25, 2021, from corresponding U.S. Appl. No. 16/480,302.
Notice of Allowance, dated Jun. 23, 2021, from corresponding U.S. Appl. No. 16/557,076.
Office Action, dated Jun. 18, 2021, from corresponding U.S. Appl. No. 16/348,117.
Office Action, dated Jun. 2, 2021, from corresponding U.S. Appl. No. 16/514,903.
Final Office Action, dated Sep. 14, 2021, from corresponding U.S. Appl. No. 16/409,599.
Final Office Action, dated Sep. 7, 2021, from corresponding U.S. Appl. No. 16/131,397.
Notice of Allowance, dated Sep. 22, 2021, from corresponding U.S. Appl. No. 16/514,903.
Office Action, dated Sep. 2, 2021, from corresponding U.S. Appl. No. 16/645,137.
Final Office Action, dated Oct. 4, 2021, from corresponding U.S. Appl. No. 16/480,302.
Office Action, dated Nov. 18, 2021, from corresponding U.S. Appl. No. 15/910,853.

* cited by examiner

METHOD OF MANUFACTURING BULKED CONTINUOUS CARPET FILAMENT

BACKGROUND

Downtimes in polymer extrusion resulting from having to clean and maintain various components used during the extrusion process may lead to lost revenue. It may be desirable to reduce or eliminate downtime in the extrusion process to increase an output of material produced from the extrusion process. For example, when recycling polyethylene terephthalate (PET) into bulked continuous filament (BCF) for use in producing carpet, it may be desirable to reduce a downtime of a particular extruder that is extruding recycled PET in order to avoid a loss of BCF that could have been produced in the down time. Accordingly, there is a need for systems and methods that reduce downtimes in polymer extrusion.

SUMMARY

A method of manufacturing bulked continuous carpet filament, according to particular embodiments, comprises: (A) providing a multi-screw extruder that comprises an MRS Section comprising a plurality of satellite screws, each of the plurality of satellite screws mounted to rotate about its respective central axis; (B) providing a first vacuum pump configured to independently maintain a pressure within the MRS Section between about 0 millibars and about 40 millibars, the first vacuum pump being operatively coupled to the MRS Section via a first opening; (C) providing a second vacuum pump arranged in parallel with the first vacuum pump and configured to independently maintain a pressure within the MRS Section between about 0 millibars and about 40 millibars and cooperate with the first vacuum pump to maintain a pressure within the MRS Section between about 0 millibars and about 5 millibars; (D) using the first vacuum pump and the second vacuum pump to maintain the pressure within the MRS Section to between about 0 millibars and about 5 millibars; (E) passing a polymer melt comprising recycled PET through the multi-screw extruder while the first vacuum pump and the second vacuum pump are maintaining the pressure in the MRS Section between about 0 millibars and about 5 millibars; and (F) after the step of passing the polymer melt through the multi-screw extruder, feeding the polymer melt into a first polymer transfer line and a second polymer transfer line.

In various embodiments, the method of manufacturing bulked continuous carpet filament further comprises: (A) providing a first spinning machine; (B) using the first spinning machine to produce bulked continuous carpet filament via the first polymer transfer line; (C) providing a second spinning machine; and (D) using the second spinning machine to produce bulked continuous carpet filament via the second polymer transfer line. In some embodiments, the method further includes shutting down the second vacuum pump for cleaning; and, while the second vacuum pump is shut down for cleaning, using the first vacuum pump to maintain the pressure within the MRS Section between about 20 millibars and about 40 millibars. In some embodiments, the method includes continuing to use the first and second spinning machines to produce bulked continuous carpet filament while the second vacuum pump is shut down for cleaning.

A method of manufacturing bulked continuous carpet filament, according to various embodiments, comprises: (A) providing a multi-screw extruder that comprises: (1) an multi-rotating screw (MRS) section housing a plurality of satellite screws, each of the plurality of satellite screws being at least partially housed within a respective extruder barrel and mounted to rotate about its respective central axis; and (2) a satellite screw extruder support system that is adapted to orbitally rotate each of the plurality of satellite screws about a main axis as each of the plurality of satellite screws rotate about its respective central axis, the main axis being substantially parallel to each respective central axis; (B) providing a pressure regulation system configured to reduce a pressure within the multi-rotating screw section to between about 0 mbar and about 5 mbar, the pressure regulation system comprising at least a first catch pot and a second catch pot, wherein the first catch pot and the second catch pot are both configured to collect one or more volatile organics and other material removed from a polymer melt by a low-pressure vacuum created by the pressure regulation system; (C) using the pressure regulation system to maintain the pressure within the MRS Section to between about 0 millibars and about 5 millibars; (D) passing a polymer melt comprising recycled PET through the multi-screw extruder while the pressure regulation system is maintaining the pressure in the MRS Section between about 0 millibars and about 5 millibars; (E) after the step of passing the polymer melt through the multi-screw extruder, feeding the polymer melt into a first polymer transfer line and a second polymer transfer line; (F) providing a first spinning machine; (G) using the first spinning machine to produce bulked continuous carpet filament via the first polymer transfer line; (H) providing a second spinning machine; (I) using the second spinning machine to produce bulked continuous carpet filament via the second polymer transfer line; (J) at least partially shutting down the pressure regulation system; (K) while the pressure regulation system is at least partially shut down, cleaning at least the first catch pot; and (L) after cleaning at least the first catch pot, resuming full operation of the pressure regulation system.

In particular embodiments: (A) the pressure regulation system comprises a first vacuum pump; (B) at least partially shutting down the pressure regulation system comprises shutting down the first vacuum pump; (C) the first catch pot and the second catch pot are operably connected to a vacuum chamber of the first vacuum pump; and (D) cleaning at least the first catch pot comprises cleaning the first catch pot and the second catch pot. In some embodiments: (A) the first catch pot and the second catch pot are operably connected to a vacuum chamber of the first vacuum pump; (B) at least partially shutting down the pressure regulation system comprises mechanically isolating the first catch pot from the vacuum chamber of the first vacuum pump; (C) cleaning at least the first catch pot comprises cleaning the first catch pot; and (D) the method further comprises, while the first catch pot is mechanically isolated from the vacuum chamber of the first vacuum pump: (1) continuing to use the pressure regulation system to maintain the pressure within the MRS Section to between about 0 millibars and about 5 millibars; and (2) continuing to pass the polymer melt comprising recycled PET through the multi-screw extruder while the pressure regulation system is maintaining the pressure in the MRS Section between about 0 millibars and about 5 millibars. In any embodiment described herein, the second catch pot may be configured to collect the one or more volatile organics and other material removed from the polymer melt by the low-pressure vacuum created by the pressure regulation system while the first catch pot is mechanically isolated from the vacuum chamber of the first vacuum pump.

In still other embodiments: (A) the pressure regulation system comprises a first vacuum pump and a second vacuum pump; (B) at least partially shutting down the pressure regulation system comprises shutting down the first vacuum pump and using the second vacuum pump to maintain a pressure within the MRS Section of between about 20 mbar and about 40 mbar; and (C) cleaning at least the first catch pot comprises cleaning one or more components of the first vacuum pump. In particular embodiments, at least partially shutting down the pressure regulation system further comprises mechanically isolating the first vacuum pump from the MRS Section. In some embodiments, continuing to produce bulked continuous carpet filament via the first and second polymer transfer lines while the pressure regulation system is at least partially shut down.

BRIEF DESCRIPTION OF THE DRAWINGS

Reference will now be made to the accompanying drawings, which are not necessarily drawn to scale, and wherein.

DETAILED DESCRIPTION OF VARIOUS EMBODIMENTS

Figure 1:
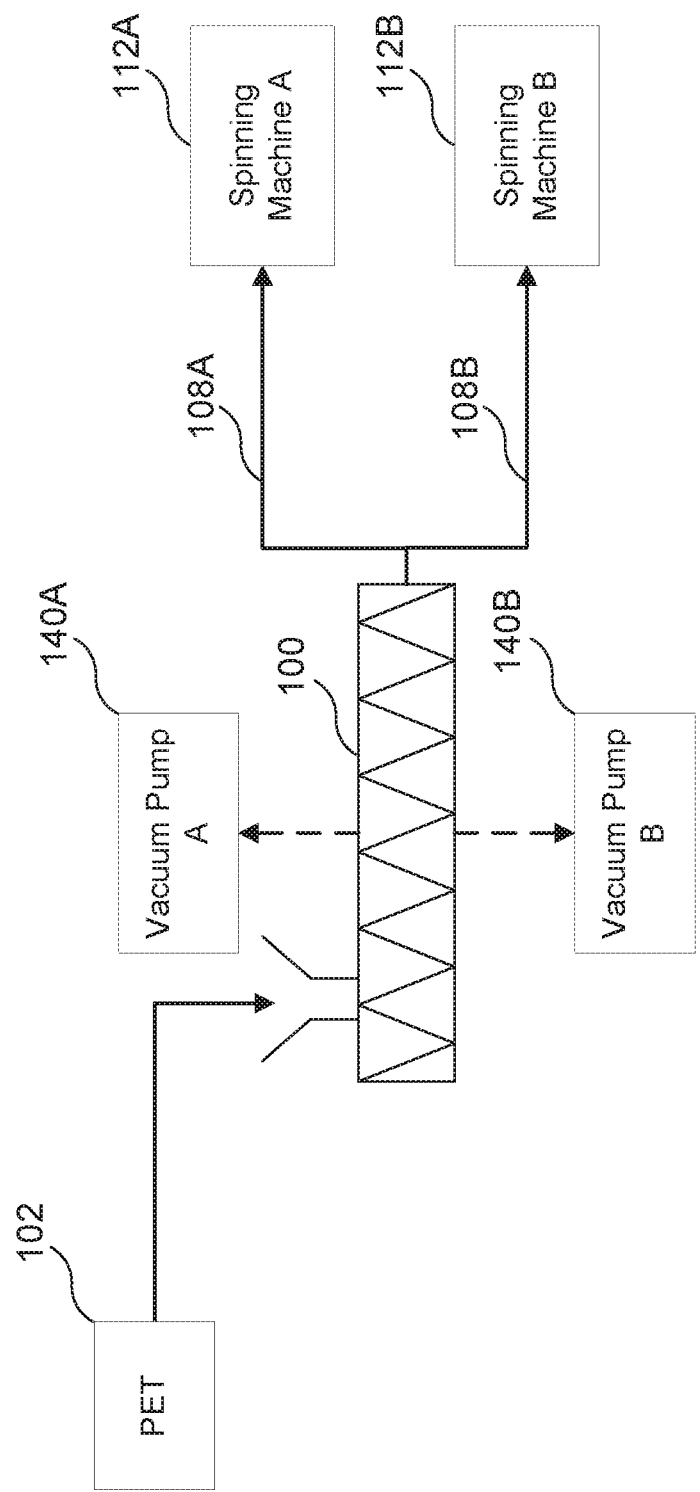
FIG. 1 depicts a process flow, according to a particular embodiment, for manufacturing bulked continuous carpet filament.

Various embodiments will now be described in greater detail. It should be understood that the invention may be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

I. Overview

New processes for making fiber from recycled polymer (e.g., recycled PET polymer) are described below. In various embodiments, these new processes utilize a dual vacuum arrangement (e.g., at least two vacuum pumps) operably coupled to the MRS section of an MRS extruder in order to remove one or more impurities from recycled polymer as the recycled polymer passes through the MRS section such that the new process: (1) is more effective than earlier processes in removing contaminates and water from the recycled polymer; (2) allows for an increased throughput through a single MRS extruder, which may, for example, result in a doubling of a number of thread lines produced from a single MRS extruder; (3) results in a desired intrinsic viscosity for the extruded recycled polymer at the increased throughput; and/or (4) reduces an amount of downtime of a particular production line that includes a single MRS extruder. In at least one embodiment, the improved process results in a recycled PET polymer having a polymer quality that is high enough that the PET polymer may be used in producing bulked continuous carpet filament from 100% recycled PET content (e.g., 100% from PET obtained from previously used PET bottles or other source of recycled PET).

A BCF (bulked continuous filament) manufacturing process, according to a particular embodiment, may generally be broken down into three steps: (1) preparing flakes of PET polymer from post-consumer bottles for use in the process; (2) passing the flakes through an extruder that melts the flakes and purifies the resulting PET polymer; and (3) feeding the purified polymer into one or more spinning machines (e.g., two spinning machines, three spinning machines, four spinning machines, eight spinning machines, up to twenty spinning machines, or any other suitable number of spinning machines) that turn the polymer into filament for use in manufacturing carpets. Various embodiments of such processes are described in U.S. Pat. No. 9,409,363 B2 entitled "Method of Manufacturing Bulked Continuous Filaments," filed Apr. 18, 2014, which is hereby incorporated by reference in its entirety. In various embodiments, a BCF manufacturing process utilizes a single MRS extruder to feed a single polymer transfer line. In embodiments utilizing a dual vacuum arrangement or other process such as those described herein, the MRS extruder may feed two or more polymer transfer lines in order to increase an amount of BCF (e.g., or recycled polymer pellets) produced in a particular period of time using a single extrusion line.

II. More Detailed Discussion

A process for producing fiber (e.g., Bulked Continuous Filament or BCF) from recycled polymer (e.g., recycled PET polymer), in various embodiments, utilizes a single multi-rotating screw extruder (e.g., MRS Extruder) to feed a plurality of spinning machines (e.g., two or more spinning machines). In various embodiments, by feeding a plurality of spinning machines from a single MRS Extruder, the process may enable an increase in a total amount of BCF produced over systems that utilize a single MRS Extruder to feed a single polymer transfer line or spinning machine over the same period of time.

As may be understood by one skilled in the art, in order to maintain a similar production rate of BCF in a plurality of spinning machines (e.g., two spinning machines) as is possible in feeding a single spinning machine from a single MRS Extruder, it may be necessary to increase a throughput of the MRS Extruder. For example, in embodiments in which the single MRS Extruder is feeding two spinning machines instead of one, it may be necessary to double the throughput of the MRS Extruder in order to achieve a throughput in each of the two spinning machines that is substantially similar to (e.g., the same as) throughput would be for a single spinning machine fed by a single MRS Extruder.

As may be further understood by one skilled in the art, increasing a throughput in the MRS Extruder may increase a frequency with which a vacuum pump or other pressure regulation system that is configured to remove volatile organics and other contaminants present in the melted polymer as the melted polymer passes through the MRS Section of the MRS Extruder needs to be cleaned. In various embodiments, the process may require the vacuum pump or pressure regulation system to reduce a pressure within the MRS Section below about 5 millibars (e.g., below about 2 millibars) in order to sufficiently remove volatile organics and other contaminants from the recycled polymer. In particular embodiments, a dirty vacuum pump or pressure regulation system may run less efficiently than a clean vacuum pump or pressure regulation system, such that the system may be unable to maintain a pressure within the MRS Section at a pressure that is sufficiently low to sufficiently remove the volatile organics and other contaminants from the recycled polymer.

In various embodiments, the process is configured to produce recycled PET polymer that has an intrinsic viscosity of at least about 0.79 dL/g (e.g., of between about 0.79 dL/g and about 1.00 dL/g). In particular embodiments, the process is configured to achieve the desired intrinsic viscosity by doubling an exposure time of the polymer melt to the vacuum in the MRS Section.

Accordingly, in particular embodiments, it may be necessary to shut down the MRS Extruder periodically in order to clean the vacuum pump or other pressure regulation system. As may be understood in light of this disclosure, shutting down the MRS Extruder may result in lost production time due to an inability to produce BCF during the down-time required to clean the vacuum pump or other pressure regulation system. In particular embodiments, such as embodiments in which the MRS Extruder feeds a single spinning machine via a single polymer transfer line, the process may involve cleaning the vacuum pump every six or seven days. In other embodiments, such as embodiments in which the MRS Extruder feeds two spinning machines via two respective polymer transfer lines, the process may involve cleaning the vacuum pump every two or three days. In still other embodiments, the vacuum pump may require cleaning at any other suitable interval necessary to maintain the vacuum pump in a manner sufficient to reduce a pressure within the MRS Section below a suitable level.

In various embodiments, cleaning a vacuum pump may take between about 15 minutes and about 1 hour. In various embodiments, cleaning a vacuum pump may include cleaning one or more catch pots that are configured to collect one or more volatile organics and other material removed from the polymer melt by the low-pressure vacuum created by the vacuum pump (e.g., one or more vacuum pumps). In particular embodiments, cleaning each particular catch pot may take between about three minutes and about five minute (e.g., about three minutes). In other embodiments, cleaning the vacuum pump may include cleaning one or more valves, elbows, pipes, etc. that make up the vacuum pump, or provide one or more connections between the vacuum pump, the MRS Extruder, the one or more catch pots, etc. In various embodiments, cleaning the pressure regulation system (e.g., one or more components that make up the pressure regulation system) may take between about twenty minutes and about twenty five minutes). In any embodiment described herein, reference to cleaning of a particular vacuum pump or particular pressure regulation system may refer to cleaning any particular component of the particular pump or pressure regulation system (e.g., one or more pipes, valves, elbows, catch pots, etc.).

In certain embodiments, a particular MRS Extruder may be configured to produce up to about 4,000 pounds of fiber per hour. In various embodiments, a particular spinning machine may produce up to about 36 fiber ends (e.g., 24 ends) via one or more spinnerets. Shutting down two spinning machines as a result of having to clean a vacuum pump, pressure regulation system, or other component thereof may result in having to shut down up to about 48 fiber ends (e.g., up to about 72 fiber ends) for a particular period of time. Accordingly, in light of the above, even a short amount of downtime may, for example, reduce a profitability of a particular MRS Extruder's BCF production line.

In particular embodiments, such as embodiments of the process described herein, the process may utilize a plurality of vacuum pumps to reduce the pressure within the MRS Section below about 5 millibars (e.g., below about 2 millibars). In exemplary embodiments, the plurality of vacuum pumps are arranged in series with one another. In other exemplary embodiments, the plurality of vacuum pumps are arranged in parallel. In particular embodiments, the plurality of vacuum pumps comprise two vacuum pumps. In such embodiments, the two vacuum pumps may cooperate to maintain the pressure in the MRS Section below a suitable pressure for sufficiently removing volatile organics and other contaminants from the recycled polymer melt. In such embodiments, the use of a plurality of vacuum pumps (e.g., two vacuum pumps) may reduce a frequency with which each of the plurality of vacuum pumps requires cleaning. In various embodiments, the process may involve alternating cleaning of the two vacuum pumps in order to enable cleaning of each particular vacuum pump without having to shut down a particular MRS Extruder's production line in order to perform the cleaning (e.g., because the first vacuum pump is configured to independently maintain the pressure within the MRS Section below the threshold value while the second vacuum pump is cleaned).

In various embodiments, each of the plurality of vacuums are independently configured for and capable of maintaining a pressure within the MRS section below about 5 millibars. In such embodiments, the system is configured such that while any one of the plurality of vacuums is offline for cleaning, any one or more of the remaining plurality of vacuum pumps is maintaining the desired pressure within the MRS Section (e.g., below about 5 millibars).

III. Exemplary Process Flow

FIG. 1 depicts an exemplary process flow that utilizes a dual vacuum arrangement as described above. As may be understood from this Figure, the process begins by running PET 102 through an MRS extruder 100. It should be understood that PET 102 is used for exemplary purposes, and that other embodiments may utilize one or more other polymers in the process (e.g., one or more polymers other than PET). As may be understood in light of this disclosure, the PET 102 may include PET 102 from any suitable source (e.g., recycled PET, virgin PET, etc.). In various embodiments, the PET 102 may include PET 102 that has gone through one or more suitable pre-processing steps (e.g., washing, drying, grinding, etc.). In particular embodiments, these one or more suitable-preprocessing steps may include any suitable step described in U.S. Pat. No. 9,409,363 B2 entitled "Method of Manufacturing Bulked Continuous Filaments," filed Apr. 18, 2014, which is incorporated herein by reference in its entirety. In particular embodiments, the PET 102 comprises a polymer melt.

In various embodiments, the MRS Extruder 100 includes any suitable MRS Extruder 100, such as any suitable MRS extruder is described in U.S. Published Patent Application 2005/0047267, entitled "Extruder for Producing Molten Plastic Materials", which was published on Mar. 3, 2005, and which is hereby incorporated herein in its entirety. In various embodiments, the PET 102 is fed into the MRS Extruder 100 where it melts into molten polymer.

Figure 2:
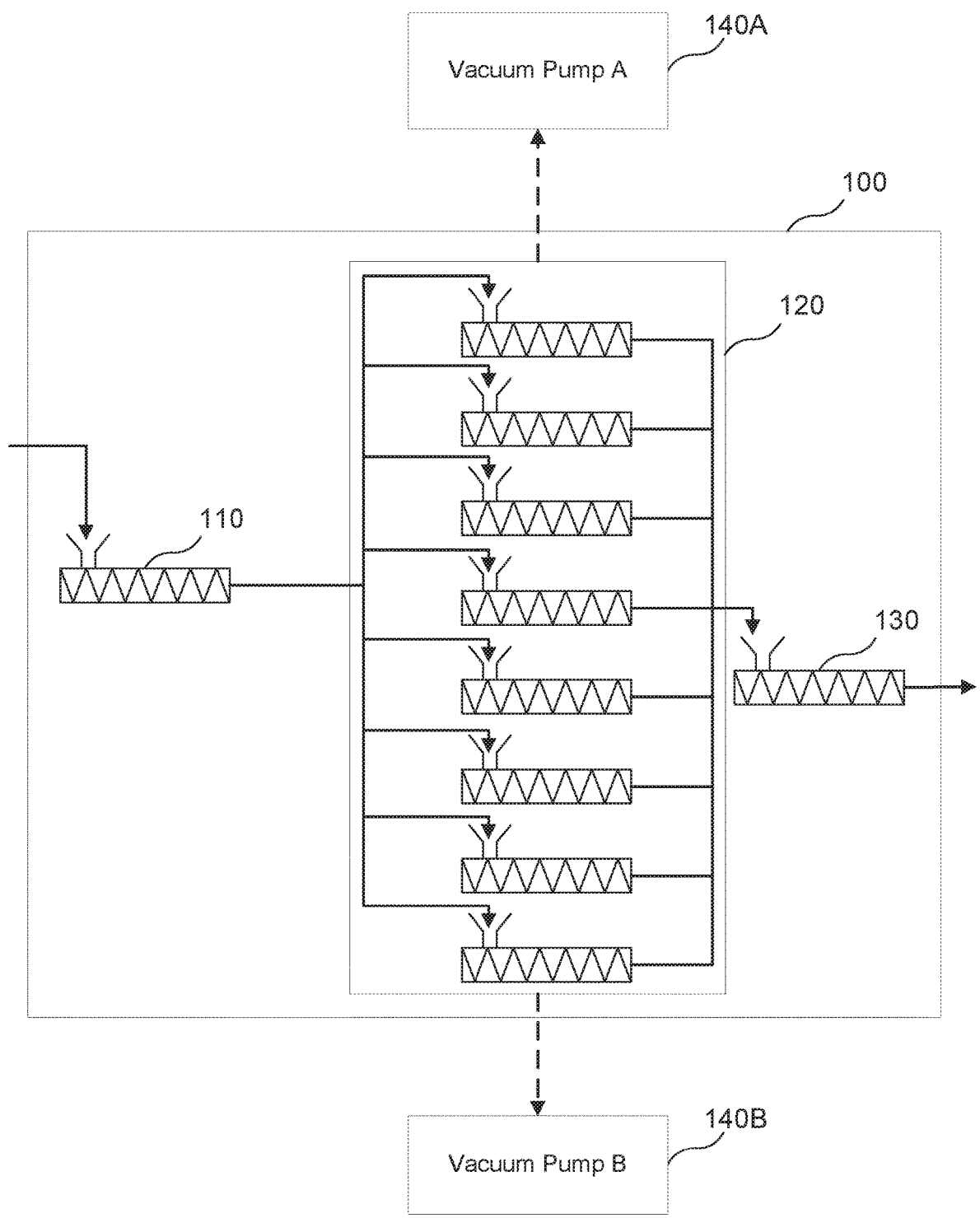
FIG. 2 depicts a process flow depicting the flow of polymer through a Multi-Rotating Screw (MRS) extruder with a dual vacuum arrangement according to a particular embodiment.

In various embodiments, the MRS Extruder 100 then separates the melt flow into a plurality of different streams (e.g., 4, 6, 8, or more streams) through respective open chambers. These streams, as shown in FIG. 2, are subsequently fed, respectively, through a plurality of satellite screws in an MRS Section 120 (e.g., eight satellite screws). As may be further understood from FIG. 2, the MRS Extruder 100 further comprises a first single screw section 110 that feeds the polymer into the MRS Section 120 and a second single screw section 130 that recombines the polymer stream into a single stream following the MRS Section 120.

As may be understood from FIG. 2, in various embodiments, the MRS extruder's MRS Section 120 is fitted with one or more Vacuum Pumps (e.g., Vacuum Pump A 140A and Vacuum Pump B 140B) that are operatively coupled to the MRS section 120 so that Vacuum Pump A 140A and Vacuum Pump B 140B are each in communication with the interior of the MRS section 120 via a suitable respective opening in the MRS section's housing. In some embodiments, Vacuum Pump A 140A and Vacuum Pump B 140B are in operative communication with opposing portions of the MRS section 120 (e.g., via one or more respective openings). In particular embodiments, Vacuum Pump A 140A and Vacuum Pump B 140B are operatively coupled to the MRS Extruder 100 and configured to maintain a pressure within the MRS Section 120 below a particular threshold pressure (e.g., using one or more suitable computer-controllers).

In particular embodiments, Vacuum Pump A 140A and Vacuum Pump B 140B are arranged in series with one another. In still other embodiments, Vacuum Pump A 140A and Vacuum Pump B 140B are arranged in parallel. Although in the embodiment shown in this Figure, a dual vacuum arrangement is shown, it should be understood in light of this disclosure that various other embodiments of a multi-vacuum extruder system may include any other suitable number of (e.g., 1, 3, 4, 5, 6, 7, etc.) vacuum pumps or pressure regulation systems in communication with the interior portion MRS section 120 in any suitable arrangement.

In particular embodiments, each particular Vacuum Pump is configured to maintain the pressure within the MRS Section 120 within a particular pressure range. In other embodiments, one or more of a plurality of Vacuum Pumps are configured to cooperate to maintain the pressure within the particular range.

As discussed above, in the embodiment shown in FIGS. 1 and 2, Vacuum Pump A 140A and Vacuum Pump B 140B are configured to maintain a pressure within the MRS Section 120 below a particular pressure (e.g., or within a particular range of pressure), for example, using a suitable computer-controller. In particular embodiments, the particular pressure is below about 5 millibars. In various embodiments, the particular pressure is below about 2 millibars. In other embodiments, the particular pressure is a particular pressure within a particular pressure range between about 0 millibars and about 10 millibars. In still other embodiments, the particular pressure or pressure range is any suitable pressure or pressure range utilized for any suitable application, such as in the production of BCF from recycled PET as described herein.

In various embodiments, the low-pressure vacuum created by Vacuum Pump A 140A and Vacuum Pump B 140B in the MRS Section 120 may remove, for example: (1) volatile organics present in the melted polymer as the melted polymer passes through the MRS Section 120; and/or (2) at least a portion of any interstitial water that was present in the recycled polymer when it entered the MRS Extruder 100. In various embodiments, the low-pressure vacuum removes substantially all (e.g., all) of the water and contaminants from the recycled polymer melt.

In particular embodiments, the Vacuum Pump A 140A and Vacuum Pump B 140B each comprise a jet vacuum pump fit to the MRS extruder 100. In various embodiments, Vacuum Pump A 140A and Vacuum Pump B 140B comprise one or more mechanical lobe pumps (which may, for example, require repeated cleaning due to volatiles coming off of and condensing on the lobes of the pump). In a particular embodiment, one or more of the Vacuum Pump A 140A and Vacuum Pump B 140B comprise a jet vacuum pump made by Arpuma GmbH of Bergheim, Germany.

As may be understood from FIG. 1, following extrusion by the MRS Extruder 100, the process includes splitting the resulting polymer melt into two polymer transfer lines (e.g., 108A and 108B) in order to feed at least two spinning machines (e.g., Spinning Machine A 112A and Spinning Machine B 112B). As discussed above, by feeding at least two spinning machines from a single MRS Extruder 100, the process may enable up to a doubling (or more) of an amount of BCF produced from the single MRS Extruder 100. Although the embodiment shown in this figure depicts a single extruder feeding two spinning machines, it should be understood that in other embodiments of the process described herein, the process may include feeding any other suitable number of spinning machines. For example, in some embodiments, the extruder is configured to feed up to twenty-four spinning machines (e.g., two spinning machines, four spinning machines, six spinning machines, eight spinning machines, ten spinning machines, sixteen spinning machines, etc.).

In particular embodiments, the at least two spinning machines (e.g., Spinning Machine A 112A and Spinning Machine B 112B) used in the process described above comprise at least two Sytec One spinning machines manufactured by Oerlikon Neumag of Neumuenster, Germany. The Sytec One machine may be especially adapted for hard-to-run fibers, such as nylon or solution-dyed fibers, where the filaments are prone to breakage during processing. In various embodiments, the Sytec One machines keep the runs downstream of the spinneret as straight as possible, use only one threadline each, and are designed to be quick to rethread when there are filament breaks.

Although the example described above describes using the Sytec One spinning machine to produce carpet yarn filament from the polymer, it should be understood that any other suitable spinning machine may be used. Such spinning machines may include, for example, any suitable one-threadline or three-threadline spinning machine made by Oerlikon Neumag of Neumuenster, Germany or any other company.

IV. Exemplary Process Implementation

In particular embodiments, the process may be implemented in the context of a production line for producing BCF from recycled PET (e.g., recycled PET bottles). In a particular example, the process includes a single MRS Extruder coupled to a first vacuum pump 140A and a second vacuum pump 140B. In this example, the first vacuum pump and second vacuum pump are configured to cooperate to maintain a pressure within an MRS Section of the MRS Extruder below about 5 millibars during extrusion of the recycled PET. The first and second vacuum pumps are further configured to independently maintain pressure within an MRS Section of the MRS Extruder below about 5 millibars during extrusion of the recycled PET (e.g., while the other vacuum pump may be offline for cleaning).

In this example, the first and second vacuum pump may alternately be cleaned according to a particular cleaning schedule such that for example, the first vacuum pump is cleaned at a first time and the second vacuum pump is cleaned at a second time that does not coincide with the first time. In such embodiments, while the first vacuum pump is being cleaned (e.g., and offline), the production line continues to produce BCF via the MRS Extruder and the second vacuum pump is configured to maintain the pressure within the MRS Section below about 5 millibars (e.g., while the first vacuum pump is offline for cleaning).

In particular other embodiments, while the first vacuum pump is being cleaned (e.g., and offline), the production line continues to produce BCF via the MRS Extruder and the second vacuum pump is configured to maintain the pressure within the MRS Section at a pressure other than below about 5 millibars (e.g., while the first vacuum pump is offline for cleaning). For example, in a particular embodiment, the process involves raising a pressure level within the MRS Section using the second vacuum pump while the first vacuum pump is offline for cleaning. For example, the system may be configured to maintain a pressure of up to about 40 mbar (e.g., up to about 25 mbar, up to about 30 mbar, etc.) within the MRS Section using the second vacuum pump while the first vacuum pump is offline for cleaning. In such embodiments, the process may be configured to continue to produce BCF while the first vacuum pump is offline. In various embodiments, the process may, for example, involve: (1) shutting down the first vacuum pump; (2) raising the pressure in the MRS Section using the second vacuum pump to about 25 mbar; (2) cleaning the first vacuum pump; (3) powering up the first vacuum pump after cleaning; and (4) reducing the pressure within the MRS Section back to below about 5 mbar using the first and second vacuum pumps. The system may, in various embodiments, perform similar steps in order to independently clean the second vacuum pump.

In particular embodiments, the process may involve mechanically isolating either of the first vacuum pump or the second vacuum pump (e.g., before or after the first or second vacuum pumped has been shut down). In this way, the process may enable the remaining vacuum pump to achieve the desired pressure within the MRS Section without pulling air from the shut-off pump. By mechanically isolating the powered off pump, the process may allow for access to one or more components of the powered-off pump (e.g., one or more catch pots, valves, pipes, hoses, elbows, etc.) for cleaning without affecting the vacuum within the MRS Section.

In this example, the MRS Extruder feeds two polymer transfer lines (e.g., which feed two spinning machines), which may, for example, double a production capacity of the production line when compared to a production line that feeds a single spinning machine (e.g., via a single polymer transfer line). By utilizing the system described herein, the process may result in the process running without any downtime (e.g., with limited downtime) associated with or resulting from cleaning a vacuum pump (e.g., is configured to run substantially continuously). In various embodiments, the process may involve mechanically isolating a particular one of the vacuum pumps using: (1) one or more valves; (2) one or more plates or other mechanical components to at least temporarily mechanically seal off the particular vacuum pump from the MRS Section. In particular embodiments, closing off the particular vacuum pump from the MRS Section may include sufficiently mechanically isolating the particular vacuum pump such that air cannot flow between a vacuum chamber of the vacuum pump and the MRS Section.

Figure 3:
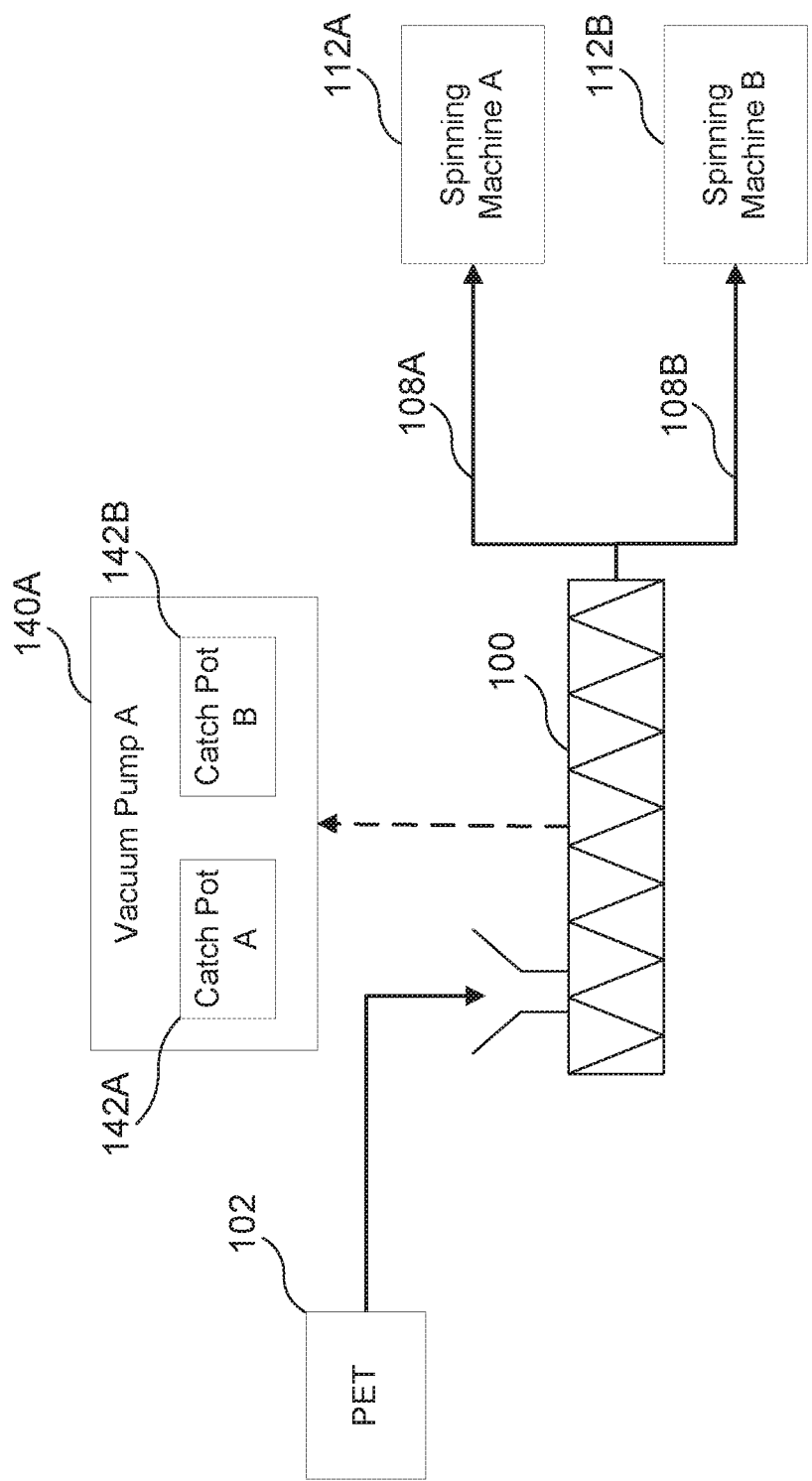
FIG. 3 depicts a process flow, according to yet another embodiment, for manufacturing bulked continuous carpet filament.

FIG. 3 depicts a process flow for producing BCF according to yet another embodiment. In the embodiment shown in this figure, the process includes a single vacuum pump 140A operably coupled to the extruder 100 that is configured to remove at least a portion of volatile organics and interstitial water from the polymer melt as the melt passes through the extruder. As shown in FIG. 3, the Vacuum Pump 140A includes a first catch pot 142A and a second catch pot 142B. Although the embodiment shown in this figure depicts a vacuum pump 140A that utilizes two catch pots, it should be understood that in other embodiments of the process, a vacuum pump 140A may be equipped with any suitable number of catch pots (e.g., one catch pot, two catch pots, three catch pots, four catch pots, etc.). In particular embodiments, each of the one or more catch pots (e.g., the first catch pot 142A and the second catch pot 142B) are configured to collect one or more volatile organics and other material removed from the polymer melt by the low-pressure vacuum created by the vacuum pump (e.g., one or more vacuum pumps). In various embodiments, each catch pot may be operably connected to the vacuum pump (e.g., a vacuum chamber of the vacuum pump) in any suitable manner (e.g., via one or more pipes, elbows, valves, etc.).

In particular embodiments, when cleaning a particular vacuum pump, the process may include cleaning one or more of the individual catch pots (e.g., the first catch pot 142A and/or the second catch pot 142B) that make up part of the vacuum system. In various embodiments, the process involves shutting down the entire extrusion line in order to clean each of the catch pots (e.g., the first catch pot 142A and/or the second catch pot 142B) that make up part of the vacuum system while the extrusion line (e.g., and the vacuum pump 140A) are offline). In other embodiment's, the process may involve cleaning one or more of the catch pots (e.g., the first catch pot 142A and/or the second catch pot 142B) that make up part of the vacuum system while the extrusion line is still running. In such embodiments, the process may, for example, include the steps of: (1) mechanically isolating the first catch pot 142A from the Vacuum Pump A 140A; (2) continuing to maintain a desired pressure within the extruder 100 using the Vacuum Pump A 140A (e.g., less than about 5 mbarr); (3) cleaning the first catch pot 142A; and (4) ceasing mechanical isolation of the cleaned first catch pot 142 from the Vacuum Pump A 140A.

In various embodiments, the use of one or more additional catch pots (e.g., two catch pots) may reduce a frequency with which a single vacuum pumped used as part of the process requires cleaning. As such, as described herein, a dual or more catch pot arrangement may reduce a downtime of the process resulting from a need to clean one or more vacuum components.

Any embodiment of a dual vacuum and/or dual catch-pot arrangement described herein may be used in the context of any suitable BCF (bulked continuous filament) manufacturing process described below. In particular embodiments, any vacuum pump or pressure regulation technique described herein may be utilized in the any process flow described below with respect to a BCF extrusion line. In various other embodiment described below, the process may feed any suitable number of polymer transfer lines (e.g., spinning machines) such as is described above.

Figure 4:
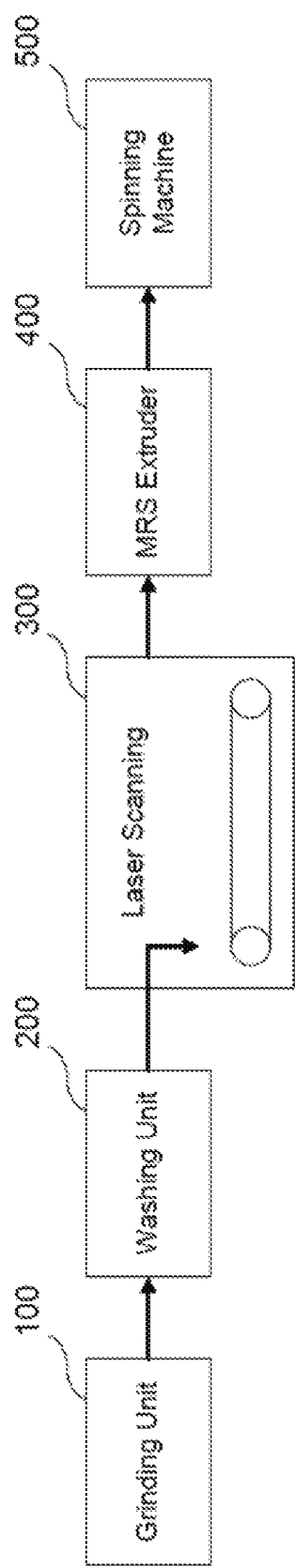
FIG. 4 depicts a process flow, according to a particular embodiment, for manufacturing bulked continuous carpet filament.

A BCF (bulked continuous filament) manufacturing process (e.g., see FIG. 4), according to a particular embodiment, may generally be broken down into three steps: (1) preparing flakes of PET polymer from post-consumer bottles for use in the process; (2) passing the flakes through an extruder that melts the flakes and purifies the resulting PET polymer; and (3) feeding the purified polymer into a spinning machine that turns the polymer into filament for use in manufacturing carpets. These three steps are described in greater detail below.

Step 1: Preparing Flakes of PET Polymer from Post-Consumer Bottles

In a particular embodiment, the step of preparing flakes of PET polymer from post-consumer bottles comprises: (A) sorting post-consumer PET bottles and grinding the bottles into flakes; (B) washing the flakes; and (C) identifying and removing any impurities or impure flakes.

A. Sorting Post-Consumer PET Bottles and Grinding the Bottles into Flakes

In particular embodiments, bales of clear and mixed colored recycled post-consumer (e.g., "curbside") PET bottles (or other containers) obtained from various recycling facilities make-up the post-consumer PET containers for use in the process. In other embodiments, the source of the post-consumer PET containers may be returned 'deposit' bottles (e.g., PET bottles whose price includes a deposit that is returned to a customer when the customer returns the bottle after consuming the bottle's contents). The curbside or returned "post-consumer" or "recycled" containers may contain a small level of non-PET contaminates. The contaminants in the containers may include, for example, non-PET polymeric contaminants (e.g., PVC, PLA, PP, PE, PS, PA, etc.), metal (e.g., ferrous and non-ferrous metal), paper, cardboard, sand, glass or other unwanted materials that may find their way into the collection of recycled PET. The non-PET contaminants may be removed from the desired PET components, for example, through one or more of the various processes described below.

In particular embodiments, smaller components and debris (e.g., components and debris greater than 2 inches in size) are removed from the whole bottles via a rotating trammel. Various metal removal magnets and eddy current systems may be incorporated into the process to remove any metal contaminants. Near Infra-Red optical sorting equipment such as the NRT Multi Sort IR machine from Bulk Handling Systems Company of Eugene, Oreg., or the Spyder IR machine from National Recovery Technologies of Nashville, Tenn., may be utilized to remove any loose polymeric contaminants that may be mixed in with the PET flakes (e.g., PVC, PLA, PP, PE, PS, and PA). Additionally, automated X-ray sorting equipment such as a VINYL-CYCLE machine from National Recovery Technologies of Nashville, Tenn. may be utilized to remove remaining PVC contaminants.

In particular embodiments, a binary segregation of the clear materials from the colored materials is achieved using automated color sorting equipment equipped with a camera detection system (e.g., an Multisort ES machine from National Recovery Technologies of Nashville, Tenn.). In various embodiments, manual sorters are stationed at various points on the line to remove contaminants not removed by the sorter and any colored bottles. In particular embodiments, the sorted material is taken through a granulation step (e.g., using a 50B Granulator machine from Cumberland Engineering Corporation of New Berlin, Wis.) to size reduce (e.g., grind) the bottles down to a size of less than one half of an inch. In various embodiments, the bottle labels are removed from the resultant "dirty flake" (e.g., the PET flakes formed during the granulation step) via an air separation system prior to entering the wash process.

B. Washing the Flakes

In particular embodiments, the "dirty flake" is then mixed into a series of wash tanks. As part of the wash process, in various embodiments, an aqueous density separation is utilized to separate the olefin bottle caps (which may, for example, be present in the "dirty flake" as remnants from recycled PET bottles) from the higher specific gravity PET flakes. In particular embodiments, the flakes are washed in a heated caustic bath to about 190 degrees Fahrenheit. In particular embodiments, the caustic bath is maintained at a concentration of between about 0.6% and about 1.2% sodium hydroxide. In various embodiments, soap surfactants as well as defoaming agents are added to the caustic bath, for example, to further increase the separation and cleaning of the flakes. A double rinse system then washes the caustic from the flakes.

In various embodiments, the flake is centrifugally dewatered and then dried with hot air to at least substantially remove any surface moisture. The resultant "clean flake" is then processed through an electrostatic separation system (e.g., an electrostatic separator from Carpco, Inc. of Jacksonville, Fla.) and a flake metal detection system (e.g., an MSS Metal Sorting System) to further remove any metal contaminants that remain in the flake. In particular embodiments, an air separation step removes any remaining label from the clean flake. In various embodiments, the flake is then taken through a flake color sorting step (e.g., using an OPTIMIX machine from TSM Control Systems of Dundalk, Ireland) to remove any remaining color contaminants remaining in the flake. In various embodiments, an electro-optical flake sorter based at least in part on Raman technology (e.g., a Powersort 200 from Unisensor Sensorsysteme GmbH of Karlsruhe, Germany) performs the final polymer separation to remove any non-PET polymers remaining in the flake. This step may also further remove any remaining metal contaminants and color contaminants.

In various embodiments, the combination of these steps delivers substantially clean (e.g., clean) PET bottle flake comprising less than about 50 parts per million PVC (e.g., 25 ppm PVC) and less than about 15 parts per million metals for use in the downstream extrusion process described below.

C. Identifying and Removing Impurities and Impure Flakes

In particular embodiments, after the flakes are washed, they are fed down a conveyor and scanned with a high-speed laser system 300. In various embodiments, particular lasers that make up the high-speed laser system 300 are configured to detect the presence of particular contaminates (e.g., PVC or Aluminum). Flakes that are identified as not consisting essentially of PET may be blown from the main stream of flakes with air jets. In various embodiments, the resulting level of non-PET flakes is less than 25 ppm.

In various embodiments, the system is adapted to ensure that the PET polymer being processed into filament is substantially free of water (e.g., entirely free of water). In a particular embodiment, the flakes are placed into a pre-conditioner for between about 20 and about 40 minutes (e.g., about 30 minutes) during which the pre-conditioner blows the surface water off of the flakes. In particular embodiments, interstitial water remains within the flakes. In various embodiments, these "wet" flakes (e.g., flakes comprising interstitial water) may then be fed into an extruder (e.g., as described in Step 2 below), which includes a vacuum setup designed to remove—among other things—the interstitial water that remains present in the flakes following the quick-drying process described above.

Step 2: Using an Extrusion System to Melt and Purify PET Flakes

Figure 5:
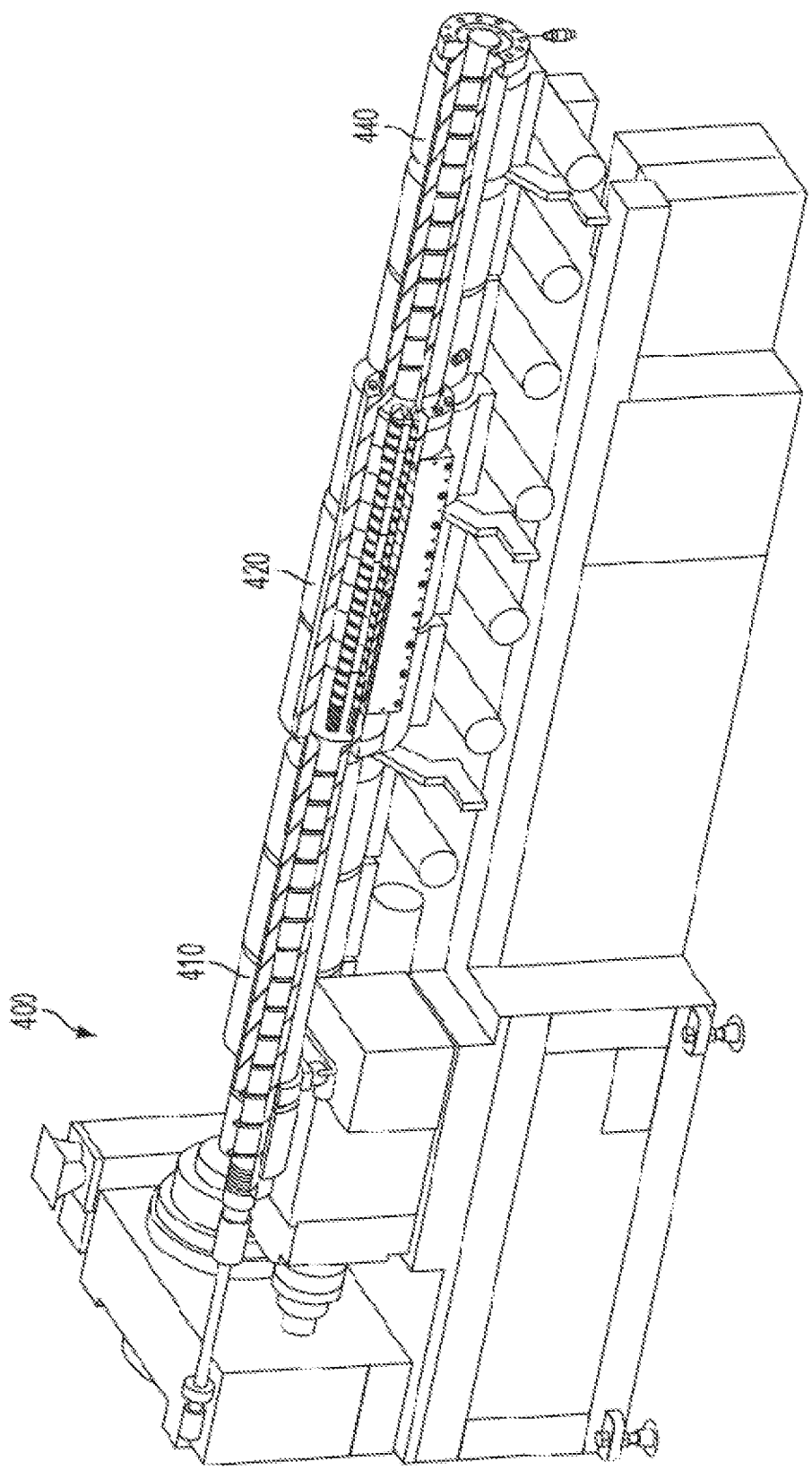
FIG. 5 is a perspective view of an MRS extruder that is suitable for use in the process of FIG. 1.
Figure 6:
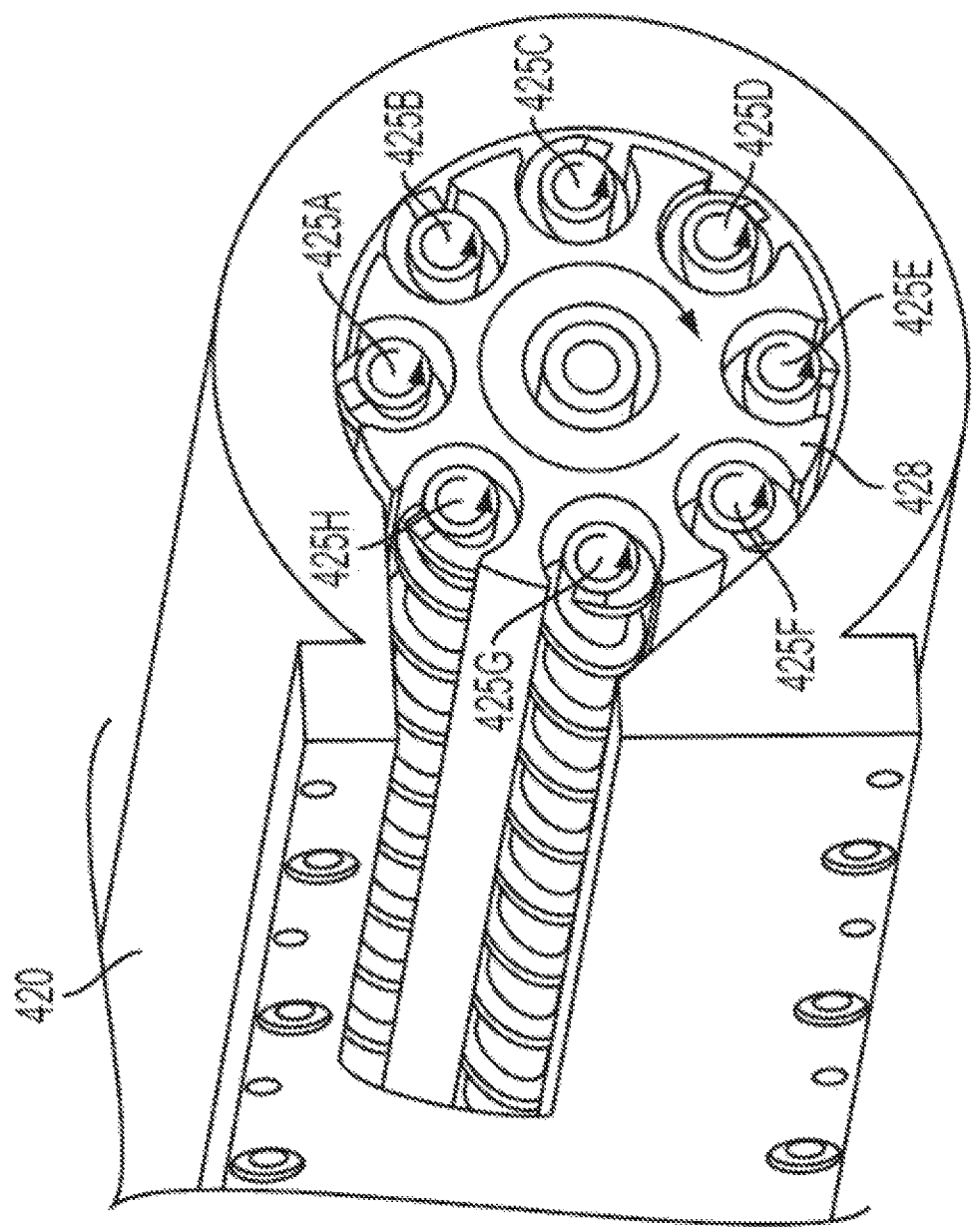
FIG. 6 is a cross-sectional view of an exemplary MRS section of the MRS extruder of FIG. 5.

In particular embodiments, an extruder is used to turn the wet flakes described above into a molten recycled PET polymer and to perform a number of purification processes to prepare the polymer to be turned into BCF for carpet. As noted above, in various embodiments, after STEP 1 is complete, the recycled PET polymer flakes are wet (e.g., surface water is substantially removed (e.g., fully removed) from the flakes, but interstitial water remains in the flakes). In particular embodiments, these wet flakes are fed into a Multiple Rotating Screw ("MRS") extruder 400. In other embodiments, the wet flakes are fed into any other suitable extruder (e.g., a twin screw extruder, a multiple screw extruder, a planetary extruder, or any other suitable extrusion system). An exemplary MRS Extruder 400 is shown in FIGS. 5 and 6. A particular example of such an MRS extruder is described in U.S. Published Patent Application 2005/0047267, entitled "Extruder for Producing Molten Plastic Materials", which was published on Mar. 3, 2005, and which is hereby incorporated herein by reference.

As may be understood from this figure, in particular embodiments, the MRS extruder includes a first single-screw extruder section 410 for feeding material into an MRS section 420 and a second single-screw extruder section 440 for transporting material away from the MRS section.

In various embodiments, the wet flakes are fed directly into the MRS extruder 400 substantially immediately (e.g., immediately) following the washing step described above (e.g., without drying the flakes or allowing the flakes to dry). In particular embodiments, a system that feeds the wet flakes directly into the MRS Extruder 400 substantially immediately (e.g., immediately) following the washing step described above may consume about 20% less energy than a system that substantially fully pre-dries the flakes before extrusion (e.g., a system that pre-dries the flakes by passing hot air over the wet flakes for a prolonged period of time). In various embodiments, a system that feeds the wet flakes directly into the MRS Extruder 400 substantially immediately (e.g., immediately) following the washing step described above avoids the need to wait a period of time (e.g., up to eight hours) generally required to fully dry the flakes (e.g., remove all of the surface and interstitial water from the flakes).

Figure 7:
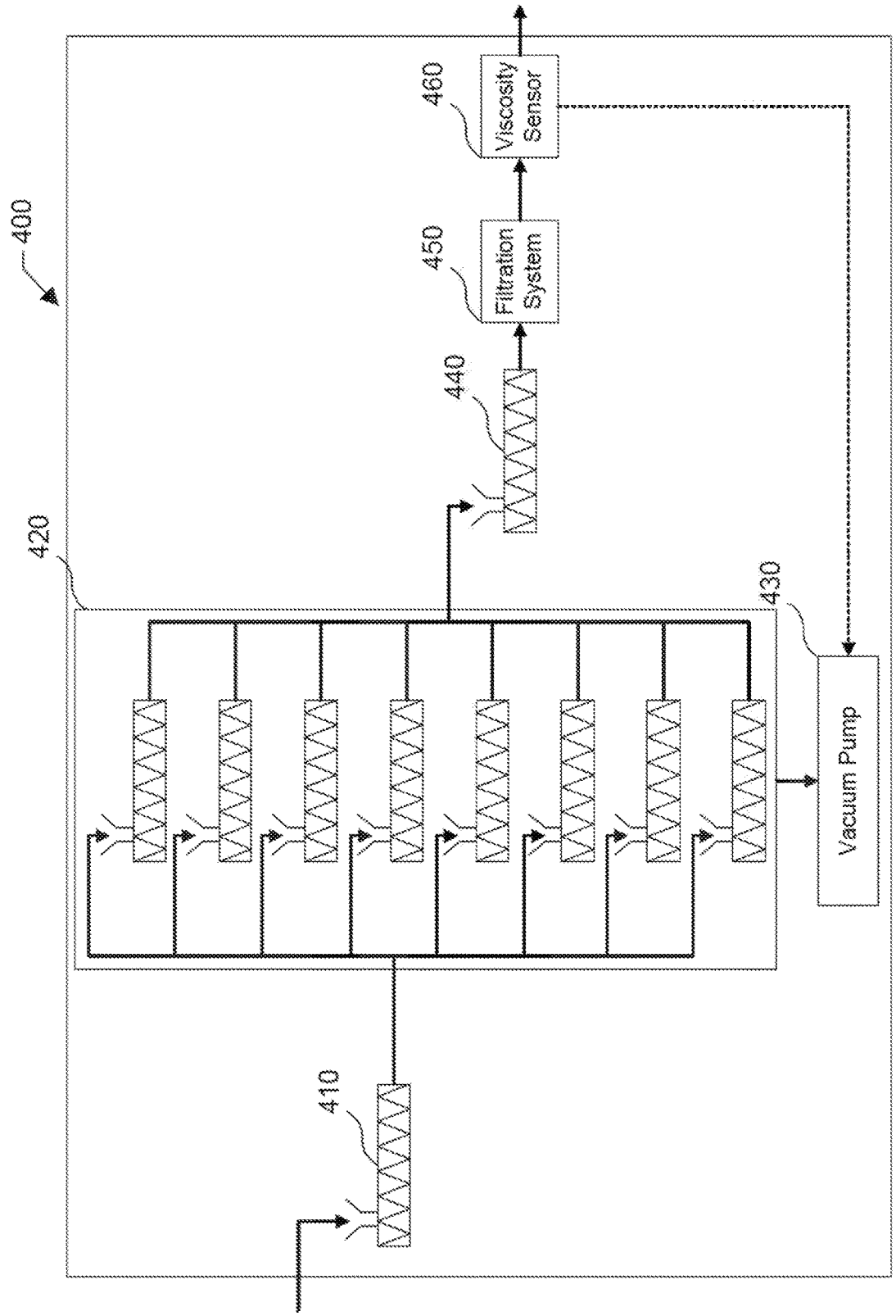
FIG. 7 depicts a process flow depicting the flow of polymer through an MRS extruder and filtration system according to a particular embodiment.

FIG. 7 depicts a process flow that illustrates the various processes performed by the MRS Extruder 400 in a particular embodiment. In the embodiment shown in this figure, the wet flakes are first fed through the MRS extruder's first single-screw extruder section 410, which may, for example, generate sufficient heat (e.g., via shearing) to at least substantially melt (e.g., melt) the wet flakes.

The resultant polymer melt (e.g., comprising the melted flakes), in various embodiments, is then fed into the extruder's MRS section 420, in which the extruder separates the melt flow into a plurality of different streams (e.g., 4, 6, 8, or more streams) through a plurality of open chambers. FIG. 3 shows a detailed cutaway view of an MRS Section 420 according to a particular embodiment. In particular embodiments, such as the embodiment shown in this figure, the MRS Section 420 separates the melt flow into eight different streams, which are subsequently fed through eight satellite screws 425A-H. As may be understood from FIG. 5, in particular embodiments, these satellite screws are substantially parallel (e.g., parallel) to one other and to a primary screw axis of the MRS Machine 400.

In the MRS section 420, in various embodiments, the satellite screws 425A-H may, for example, rotate faster than (e.g., about four times faster than) in previous systems. As shown in FIG. 6, in particular embodiments: (1) the satellite screws 425A-H are arranged within a single screw drum 428 that is mounted to rotate about its central axis; and (2) the satellite screws 425A-H are configured to rotate in a direction that is opposite to the direction in which the single screw drum rotates 428. In various other embodiments, the satellite screws 425A-H and the single screw drum 428 rotate in the same direction. In particular embodiments, the rotation of the satellite screws 425A-H is driven by a ring gear. Also, in various embodiments, the single screw drum 428 rotates about four times faster than each individual satellite screw 425A-H. In certain embodiments, the satellite screws 425A-H rotate at substantially similar (e.g., the same) speeds.

In various embodiments, as may be understood from FIG. 7, the satellite screws 425A-H are housed within respective extruder barrels, which may, for example be about 30% open to the outer chamber of the MRS section 420. In particular embodiments, the rotation of the satellite screws 425A-H and single screw drum 428 increases the surface exchange of the polymer melt (e.g., exposes more surface area of the melted polymer to the open chamber than in previous systems). In various embodiments, the MRS section 420 creates a melt surface area that is, for example, between about twenty and about thirty times greater than the melt surface area created by a co-rotating twin screw extruder. In a particular embodiment, the MRS section 420 creates a melt surface area that is, for example, about twenty five times greater than the melt surface area created by a co-rotating twin screw extruder In various embodiments, the MRS extruder's MRS Section 420 is fitted with a Vacuum Pump 430 that is attached to a vacuum attachment portion 422 of the MRS section 420 so that the Vacuum Pump 430 is in communication with the interior of the MRS section via a suitable opening 424 in the MRS section's housing. In still other embodiments, the MRS Section 420 is fitted with a series of Vacuum Pumps. In particular embodiments, the Vacuum Pump 430 is configured to reduce the pressure within the interior of the MRS Section 420 to a pressure that is between about 0.5 millibars and about 5 millibars. In particular embodiments, the Vacuum Pump 430 is configured to reduce the pressure in the MRS Section 420 to less than about 1.5 millibars (e.g., about 1 millibar or less). The low-pressure vacuum created by the Vacuum Pump 430 in the MRS Section 420 may remove, for example: (1) volatile organics present in the melted polymer as the melted polymer passes through the MRS Section 420; and/or (2) at least a portion of any interstitial water that was present in the wet flakes when the wet flakes entered the MRS Extruder 400. In various embodiments, the low-pressure vacuum removes substantially all (e.g., all) of the water and contaminants from the polymer stream.

In a particular example, the Vacuum Pump 430 comprises three mechanical lobe vacuum pumps (e.g., arranged in series) to reduce the pressure in the chamber to a suitable level (e.g., to a pressure of about 1.0 millibar). In other embodiments, rather than the three mechanical lobe vacuum pump arrangement discussed above, the Vacuum Pump 430 includes a jet vacuum pump fit to the MRS extruder. In various embodiments, the jet vacuum pump is configured to achieve about 1 millibar of pressure in the interior of the MRS section 420 and about the same results described above regarding a resulting intrinsic viscosity of the polymer melt. In various embodiments, using a jet vacuum pump can be advantageous because jet vacuum pumps are steam powered and therefore substantially self-cleaning (e.g., self-cleaning), thereby reducing the maintenance required in comparison to mechanical lobe pumps (which may, for example, require repeated cleaning due to volatiles coming off and condensing on the lobes of the pump). In a particular embodiment, the Vacuum Pump 430 is a jet vacuum pump is made by Arpuma GmbH of Bergheim, Germany.

In particular embodiments, after the molten polymer is run the through the multi-stream MRS Section 420, the streams of molten polymer are recombined and flow into the MRS extruder's second single screw section 440. In various embodiments, the single stream of molten polymer is next run through a filtration system 450 that includes at least one filter. In a particular embodiment, the filtration system 450 includes two levels of filtration (e.g., a 40 micron screen filter followed by a 25 micron screen filter). Although, in various embodiments, water and volatile organic impurities are removed during the vacuum process as discussed above, particulate contaminates such as, for example, aluminum particles, sand, dirt, and other contaminants may remain in the polymer melt. Thus, this filtration step may be advantageous in removing particulate contaminates (e.g., particulate contaminates that were not removed in the MRS Section 420).

In particular embodiments, a viscosity sensor 460 (see FIG. 7) is used to sense the melt viscosity of the molten polymer stream following its passage through the filtration system 450. In various embodiments, the viscosity sensor 460, measures the melt viscosity of the stream, for example, by measuring the stream's pressure drop across a known area. In particular embodiments, in response to measuring an intrinsic viscosity of the stream that is below a predetermined level (e.g., below about 0.8 g/dL), the system may: (1) discard the portion of the stream with low intrinsic viscosity; and/or (2) lower the pressure in the MRS Section 420 in order to achieve a higher intrinsic viscosity in the polymer melt. In particular embodiments, decreasing the pressure in the MRS Section 420 is executed in a substantially automated manner (e.g., automatically) using the viscosity sensor in a computer-controlled feedback control loop with the vacuum section 430.

In particular embodiments, removing the water and contaminates from the polymer improves the intrinsic viscosity of the recycled PET polymer by allowing polymer chains in the polymer to reconnect and extend the chain length. In particular embodiments, following its passage through the MRS Section 420 with its attached Vacuum Pump 430, the recycled polymer melt has an intrinsic viscosity of at least about 0.79 dL/g (e.g., of between about 0.79 dL/g and about 1.00 dL/g). In particular embodiments, passage through the low pressure MRS Section 420 purifies the recycled polymer melt (e.g., by removing the contaminants and interstitial water) and makes the recycled polymer substantially structurally similar to (e.g., structurally the same as) pure virgin PET polymer. In particular embodiments, the water removed by the vacuum includes both water from the wash water used to clean the recycled PET bottles as described above, as well as from unreacted water generated by the melting of the PET polymer in the single screw heater 410 (e.g., interstitial water). In particular embodiments, the majority of water present in the polymer is wash water, but some percentage may be unreacted water.

In particular embodiments, the resulting polymer is a recycled PET polymer (e.g., obtained 100% from post-consumer PET products, such as PET bottles or containers) having a polymer quality that is suitable for use in producing PET carpet filament using substantially only (e.g., only) PET from recycled PET products.

Step 3: Purified PET Polymer Fed into Spinning Machine to be Turned into Carpet Yarn In particular embodiments, after the recycled PET polymer has been extruded and purified by the above-described extrusion process, the resulting molten recycled PET polymer is fed directly into a BCF (or "spinning") machine 500 that is configured to turn the molten polymer into bulked continuous filament. For example, in various embodiments, the output of the MRS extruder 400 is connected substantially directly (e.g., directly) to the input of the spinning machine 500 so that molten polymer from the extruder is fed directly into the spinning machine 500. This process may be advantageous because molten polymer may, in certain embodiments, not need to be cooled into pellets after extrusion (as it would need to be if the recycled polymer were being mixed with virgin PET polymer). In particular embodiments, not cooling the recycled molten polymer into pellets serves to avoid potential chain scission in the polymer that might lower the polymer's intrinsic viscosity.

In particular embodiments, the spinning machine 500 extrudes molten polymer through small holes in a spinneret in order to produce carpet yarn filament from the polymer. In particular embodiments, the molten recycled PET polymer cools after leaving the spinneret. The carpet yarn is then taken up by rollers and ultimately turned into filaments that are used to produce carpet. In various embodiments, the carpet yarn produced by the spinning machine 500 may have a tenacity between about 3 gram-force per unit denier (gf/den) and about 9 gf/den. In particular embodiments, the resulting carpet yarn has a tenacity of at least about 3 gf/den.

In particular embodiments, the spinning machine 500 used in the process described above is the Sytec One spinning machine manufactured by Oerlika Neumag of Neumuenster, Germany. The Sytec One machine may be especially adapted for hard-to-run fibers, such as nylon or solution-dyed fibers, where the filaments are prone to breakage during processing. In various embodiments, the Sytec One machine keeps the runs downstream of the spinneret as straight as possible, uses only one threadline, and is designed to be quick to rethread when there are filament breaks.

Although the example described above describes using the Sytec One spinning machine to produce carpet yarn filament from the polymer, it should be understood that any other suitable spinning machine may be used. Such spinning machines may include, for example, any suitable one-threadline or three-threadline spinning machine made by Oerlika Neumag of Neumuenster, Germany or any other company.

In various embodiments, the improved strength of the recycled PET polymer generated using the process above allows it to be run at higher speeds through the spinning machine 500 than would be possible using pure virgin PET polymer. This may allow for higher processing speeds than are possible when using virgin PET polymer.

Summary of Exemplary Process

Figure 8:
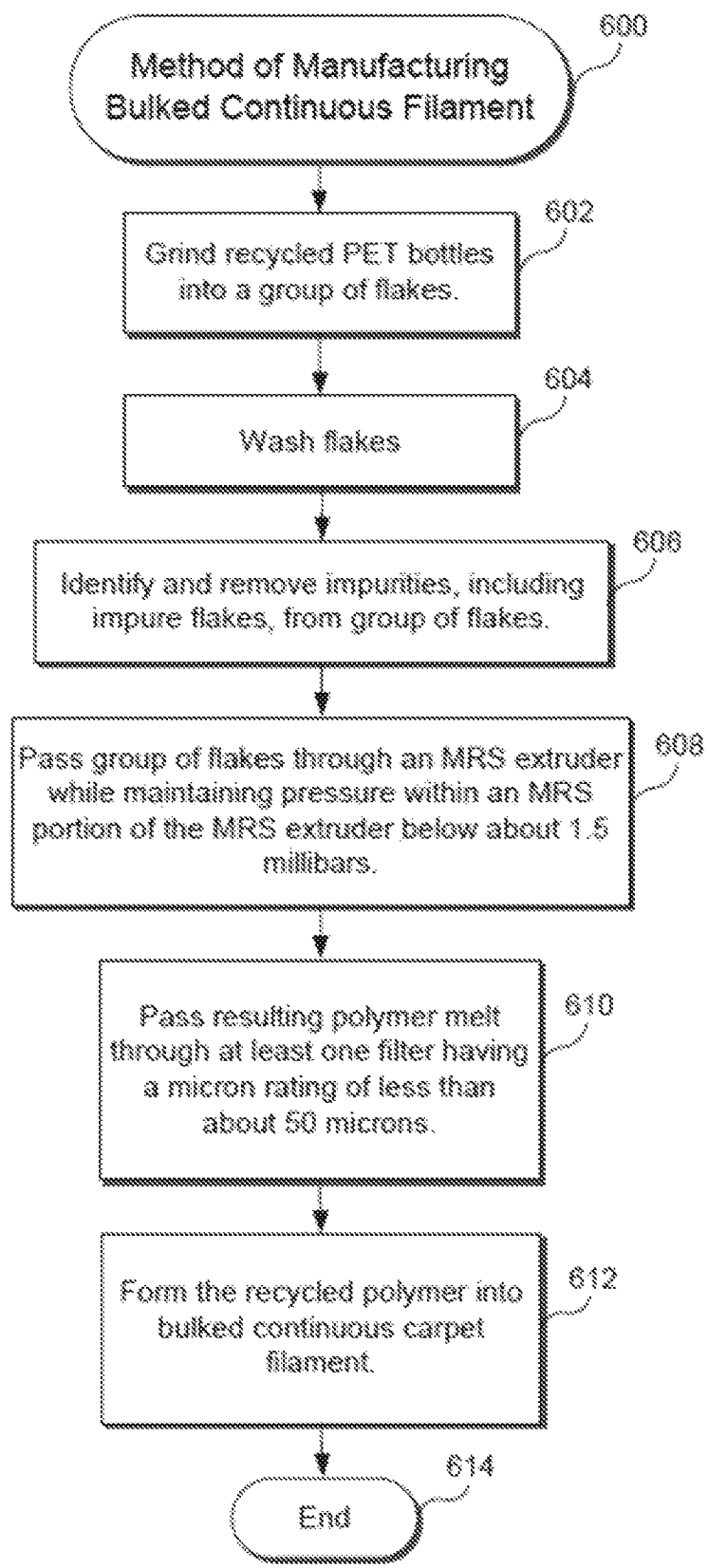
FIG. 8 is a high-level flow chart of a method, according to various embodiments, of manufacturing bulked continuous carpet filament.

FIG. 8 provides a high-level summary of the method of manufacturing bulked continuous filament described above. As shown in the figure, the method begins at Step 602, where recycled PET bottles are ground into a group of flakes. Next, at Step 604, the group of flakes is washed to remove contaminants from the flakes' respective outer surfaces. Next, at Step 606, the group of flakes is scanned (e.g., using one or more of the methods discussed above) to identify impurities, including impure flakes. These impurities, and impure flakes, are then removed from the group of flakes.

Next, at Step 608, the group of flakes is passed through an MRS extruder while maintaining the pressure within an MRS portion of the extruder below about 1.5 millibars. At Step 610, the resulting polymer melt is passed through at least one filter having a micron rating of less than about 50 microns. Finally, at Step 612, the recycled polymer is formed into bulked continuous carpet filament, which may be used in producing carpet. The method then ends at Step 614.

Alternative Embodiments

Other embodiments of the process described herein may be utilized in one or more other applications in addition to those described. For example, in particular embodiments, the process described herein that utilizes a dual or other multi-vacuum arrangement with a single MRS Extruder may be used in the production of PET nurdles (e.g., from recycled PET). In such embodiments, the process may utilize a slower throughput in the MRS Extruder in order to remove a sufficient amount of impurities from the molten polymer such that the resultant extruded polymer melt is sufficiently free of impurities to be suitable for formation into PET nurdles.

In particular embodiments, for example, higher throughput rates described above that may be utilized in order to double production of BCF of a single MRS Extruder that is feeding two polymer transfer lines may result in an extruded polymer melt with physical properties that are unsuitable for pelletizing. By reducing the throughput in the MRS Extruder, the process may expose the polymer melt to the low pressure vacuum for a longer time, which may allow for removal of a great number of impurities. As may be understood in light of this disclosure, removal of more impurities may increase a frequency with which one or more vacuum pumps require cleaning. Accordingly, one or more processes for producing PET nurdles from recycled PET may utilize the process described herein in order to similarly reduce potential downtime and required vacuum cleaning frequency.

CONCLUSION

Many modifications and other embodiments of the invention will come to mind to one skilled in the art to which this invention pertains having the benefit of the teachings presented in the foregoing descriptions and the associated drawings. For example, although the dual vacuum system discussed above is described in some embodiments as being configured to maintain the pressure in the open chambers of the MRS extruder to about 5 millibars, in other embodiments, the vacuum system may be adapted to maintain the pressure in the open chambers of the MRS extruder at pressures greater than, or less than, 1 millibars. For example, the vacuum system may be adapted to maintain this pressure at between about 0.5 millibars and about 12 millibars.

In addition, it should be understood that various embodiments may omit any of the steps described above or add additional steps. Furthermore, any numerical ranges described herein are intended to capture every integer and fractional value within the described range (e.g., every rational number value within the described range). For example, it should be understood that a range describing a pressure range of between about zero millibars and about ten millibars is intended to capture and disclose every rational number pressure between zero millibars and ten millibars (e.g., 1 millibars, 2 millibars, 3 millibars, 4 millibars, 2.1 millibars, 2.01 millibars, 2.001 millibars . . . 9.999 millibars and so on). Additionally, terms such as 'about', 'substantially', etc., when used to modify structural descriptions or numerical values are intended to capture the stated shape, value, etc. as well as account for slight variations as a result of, for example, manufacturing tolerances and/or limitations. For example, the term 'substantially rectangular' is intended to describe shapes that are both exactly rectangular (e.g., have four sides that meet at ninety degree angles) as well as shapes that are not quite exactly rectangular (e.g., shapes having four sides that meet at an angle in an acceptable tolerance of ninety degrees, such as 90°+/−4°).

Similarly, although various embodiments of the systems described above may be adapted to produce carpet filament from substantially only recycled PET (so the resulting carpet filament would comprise, consist of, and/or consist essentially of recycled PET), in other embodiments, the system may be adapted to produce carpet filament from a combination of recycled PET and virgin PET. The resulting carpet filament may, for example, comprise, consist of, and/or consist essentially of between about 80% and about 100% recycled PET, and between about 0% and about 20% virgin PET.

Also, while various embodiments are discussed above in regard to producing carpet filament from PET, similar techniques may be used to produce carpet filament from other polymers (e.g., PTT, polyester, etc.). Similarly, while various embodiments are discussed above in regard to producing carpet filament from PET, similar techniques may be used to produce other products from PET or other polymers.

In addition, it should be understood that various embodiments may omit any of the steps described above or add additional steps.

In light of the above, it is to be understood that the invention is not to be limited to the specific embodiments disclosed and that modifications and other embodiments are intended to be included within the scope of the appended claims. Although specific terms are employed herein, they are used in a generic and descriptive sense only and not for the purposes of limitation.

What is claimed is:

1. A method of manufacturing bulked continuous carpet filament, the method comprising:
   (A) providing a multi-screw extruder that comprises:
      (i) an MRS Section comprising a plurality of satellite screws, each of the plurality of satellite screws mounted to rotate about its respective central axis;
   (B) providing a first vacuum pump configured to independently maintain a pressure within the MRS Section between about 0 millibars and about 40 millibars, the first vacuum pump being operatively coupled to the MRS Section via a first opening;
   (C) providing a second vacuum pump arranged in parallel with the first vacuum pump and configured to independently maintain a pressure within the MRS Section between about 0 millibars and about 40 millibars and cooperate with the first vacuum pump to maintain a pressure within the MRS Section between about 0 millibars and about 5 millibars;
   (D) using the first vacuum pump and the second vacuum pump to maintain the pressure within the MRS Section to between about 0 millibars and about 5 millibars;
   (E) passing a polymer melt comprising recycled PET through the multi-screw extruder while the first vacuum pump and the second vacuum pump are maintaining the pressure in the MRS Section between about 0 millibars and about 5 millibars; and (F) after the step of passing the polymer melt through the multi-screw extruder, feeding the polymer melt into a first polymer transfer line and a second polymer transfer line, wherein said first vacuum pump and said second vacuum pump are in operative communication with opposing portions of the MRS section.

2. The method of claim 1, further comprising:
(G) providing a first spinning machine;
(H) using the first spinning machine to produce bulked continuous carpet filament via the first polymer transfer line;
(I) providing a second spinning machine; and
(J) using the second spinning machine to produce bulked continuous carpet filament via the second polymer transfer line.

3. The method of claim 2, further comprising:
(K) shutting down the second vacuum pump for cleaning; and
(L) while the second vacuum pump is shut down for cleaning, using the first vacuum pump to maintain the pressure within the MRS Section between about 20 millibars and about 40 millibars.

4. The method of claim 3, further comprising:
(M) continuing to use the first and second spinning machines to produce bulked continuous carpet filament while the second vacuum pump is shut down for cleaning.

5. The method of claim 3, further comprising:
(M) shutting down the first vacuum pump for cleaning; and
(N) while the first vacuum pump is shut down for cleaning, using the second vacuum pump to reduce the pressure within the MRS Section to between about 20 millibars and about 40 millibars.

6. The method of claim 5 further comprising:
while the first vacuum pump is shut down for cleaning, using the second vacuum pump to reduce the pressure within the MRS Section to about 30 millibars.

7. The method of claim 5, wherein shutting down the first vacuum pump for cleaning comprises mechanically isolating the first vacuum pump from the MRS Section.

8. The method of claim 5, further comprising:
while the first vacuum pump is shut down for cleaning, cleaning one or more components that make up the first vacuum pump.

9. The method of claim 8, wherein the one or more components are selected from the group consisting of:
one or more catch pots;
one or more pipes; and
one or more elbows.

10. The method of claim 3, further comprising:
grinding a plurality of recycled PET bottles into a group of polymer flakes;
washing the group of polymer flakes to remove at least a portion of one or more contaminants from a surface of the flakes, the group of flakes comprising a first plurality of flakes that consist essentially of PET and a second plurality of flakes that do not consist essentially of PET;
after the step of washing the first plurality of flakes:
(i) scanning the washed group of flakes to identify the second plurality of flakes; and
(ii) separating the second plurality of flakes from the first plurality of flakes; and melting the first plurality of flakes into the polymer melt prior to passing the polymer melt through the multi-screw extruder.

11. A method of manufacturing bulked continuous carpet filament, the method comprising:
(A) providing a multi-screw extruder that comprises:
a multi-rotating screw (MRS) section housing a plurality of satellite screws, each of the plurality of satellite screws being at least partially housed within a respective extruder barrel and mounted to rotate about its respective central axis; and
a satellite screw extruder support system that is adapted to orbitally rotate each of the plurality of satellite screws about a main axis as each of the plurality of satellite screws rotate about its respective central axis, the main axis being substantially parallel to each respective central axis;
(B) providing a pressure regulation system configured to reduce a pressure within the multi-rotating screw section to between about 0 mbar and about 5 mbar, the pressure regulation system comprising at least a first catch pot and a second catch pot, wherein the first catch pot and the second catch pot are both configured to collect one or more volatile organics and other material removed from a polymer melt by a low-pressure vacuum created by the pressure regulation system;
(C) using the pressure regulation system to maintain the pressure within the MRS Section to between about 0 millibars and about 5 millibars;
(D) passing a polymer melt comprising recycled PET through the multi-screw extruder while the pressure regulation system is maintaining the pressure in the MRS Section between about 0 millibars and about 5 millibars;
(E) after the step of passing the polymer melt through the multi-screw extruder, feeding the polymer melt into a first polymer transfer line and a second polymer transfer line;
(F) providing a first spinning machine;
(G) using the first spinning machine to produce bulked continuous carpet filament via the first polymer transfer line;
(H) providing a second spinning machine;
(I) using the second spinning machine to produce bulked continuous carpet filament via the second polymer transfer line;
(J) at least partially shutting down the pressure regulation system;
(K) while the pressure regulation system is at least partially shut down, cleaning at least the first catch pot; and
(L) after cleaning at least the first catch pot, resuming full operation of the pressure regulation system, wherein:
the pressure regulation system comprises a first vacuum pump and a second vacuum pump;
said first vacuum pump and said second vacuum pump are in operative communication with opposing portions of the MRS section; and
at least partially shutting down the pressure regulation system comprises shutting down the first vacuum pump and using the second vacuum pump to maintain a pressure within the MRS Section of between about 20 mbar and about 40 mbar; and
cleaning at least the first catch pot comprises cleaning one or more components of the first vacuum pump.

12. The method of claim 11, wherein:
the pressure regulation system comprises a first vacuum pump;
at least partially shutting down the pressure regulation system comprises shutting down the first vacuum pump;
the first catch pot and the second catch pot are operably connected to a vacuum chamber of the first vacuum pump; and
cleaning at least the first catch pot comprises cleaning the first catch pot and the second catch pot.

13. The method of claim 11, wherein:
the first catch pot and the second catch pot are operably connected to a vacuum chamber of the first vacuum pump;
at least partially shutting down the pressure regulation system comprises mechanically isolating the first catch pot from the vacuum chamber of the first vacuum pump;
cleaning at least the first catch pot comprises cleaning the first catch pot; and
the method further comprises:
  while the first catch pot is mechanically isolated from the vacuum chamber of the first vacuum pump:
    continuing to use the pressure regulation system to maintain the pressure within the MRS Section to between about 0 millibars and about 5 millibars; and
    continuing to pass the polymer melt comprising recycled PET through the multi-screw extruder while the pressure regulation system is maintaining the pressure in the MRS Section between about 0 millibars and about 5 millibars, wherein:
      the second catch pot is configured to collect the one or more volatile organics and other material removed from the polymer melt by the low-pressure vacuum created by the pressure regulation system while the first catch pot is mechanically isolated from the vacuum chamber of the first vacuum pump.

14. The method of claim 11, wherein at least partially shutting down the pressure regulation system further comprises mechanically isolating the first vacuum pump from the MRS Section.

15. The method of claim 11, the method further comprising:
  continuing to produce bulked continuous carpet filament via the first and second polymer transfer lines while the pressure regulation system is at least partially shut down.

16. The method of claim 11, wherein at least partially shutting down the pressure regulation system comprises using the second vacuum pump to maintain the pressure within the MRS Section at about 30 mbar.

17. The method of claim 11, further comprising:
providing a viscosity sensor;
using the viscosity sensor to measure an intrinsic viscosity of the polymer melt after the polymer melt passes through the multi-screw extruder; and
using the second vacuum pump to reduce the pressure in the MRS Section in response to the viscosity sensor measuring the intrinsic viscosity to be below a particular viscosity level.

18. The method of claim 17, wherein the particular viscosity level is below about 0.79 dL/g.

19. The method of claim 11, wherein the pressure regulation system is configured to remove the one or more volatile organics and other material from the polymer melt.

\* \* \* \* \*